United States Patent
Takeda et al.

(10) Patent No.: US 11,019,578 B2
(45) Date of Patent: *May 25, 2021

(54) TERMINAL, BASE STATION, AND COMMUNICATION METHOD

(71) Applicant: Sun Patent Trust, New York, NY (US)

(72) Inventors: Kazuki Takeda, Kanagawa (JP); Akihiko Nishio, Osaka (JP); Daichi Imamura, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/274,886

(22) Filed: Feb. 13, 2019

(65) Prior Publication Data

US 2019/0182780 A1    Jun. 13, 2019

Related U.S. Application Data

(63) Continuation of application No. 15/285,386, filed on Oct. 4, 2016, now Pat. No. 10,257,790, which is a (Continued)

(30) Foreign Application Priority Data

Oct. 3, 2011  (JP) ................................ 2011-219540
May 10, 2012 (JP) ................................ 2012-108449

(51) Int. Cl.
*H04W 52/32* (2009.01)
*H04W 52/14* (2009.01)
(Continued)

(52) U.S. Cl.
CPC ....... *H04W 52/325* (2013.01); *H04W 52/146* (2013.01); *H04W 52/18* (2013.01);
(Continued)

(58) Field of Classification Search
None
See application file for complete search history.

(56) References Cited

U.S. PATENT DOCUMENTS

| 8,478,279 B2 * | 7/2013 | Nishikawa .......... H04W 52/225 455/446 |
| 8,938,247 B2 | 1/2015 | Gorokhov |

(Continued)

FOREIGN PATENT DOCUMENTS

| EP | 2 426 973 A1 | 3/2012 |
| JP | 2010-258831 A | 11/2010 |

(Continued)

OTHER PUBLICATIONS

3GPP TS 36.213 V10.1.0, "$3^{rd}$ Generation Partnership Project; Technical Specification Group Radio Access Network; Evolved Universal Terrestrial Radio Access (E-UTRA); Physical layer procedures (Release 10)," 3GPP Organizational Partners, Mar. 2011, 115 pages.

(Continued)

*Primary Examiner* — Noel R Beharry
*Assistant Examiner* — Rodrick Mak
(74) *Attorney, Agent, or Firm* — Seed IP Law Group LLP

(57) ABSTRACT

Provided is a terminal with which it is possible, in a heterogeneous cell network, to transmit a Periodic-Sounding Reference Signal (P-SRS) at a transmission bandwidth and power density necessary for carrying out both a process of selection of a transceiving participating base station and a process of frequency scheduling of a Physical Uplink Shared Channel (PUSCH). A terminal (300) comprises a receiving unit (301) which receives control information which includes information which denotes a P-SRS transmission parameter, and a transmission unit (303) which, using a transmission parameter which is included in the received control information, transmits a first P-SRS provided with a (Continued)

first bandwidth and a first power density at a first period, and transmits a second P-SRS provided with a second bandwidth which is narrower than the first bandwidth and second power density which is higher than the first power density at a second period.

16 Claims, 19 Drawing Sheets

Related U.S. Application Data continuation of application No. 14/239,907, filed as application No. PCT/JP2012/005950 on Sep. 19, 2012, now Pat. No. 9,497,711.

(51) Int. Cl.
*H04W 52/24* (2009.01)
*H04W 52/18* (2009.01)
*H04W 72/04* (2009.01)
*H04W 52/58* (2009.01)

(52) U.S. Cl.
CPC ....... *H04W 52/248* (2013.01); *H04W 72/042* (2013.01); *H04W 72/0413* (2013.01); *H04W 52/58* (2013.01)

(56) References Cited

U.S. PATENT DOCUMENTS

| | | |
|---|---|---|
| 2008/0069039 A1 | 3/2008 | Li et al. |
| 2009/0325625 A1 | 12/2009 | Hugl et al. |
| 2010/0246561 A1 | 9/2010 | Shin et al. |
| 2010/0273494 A1 | 10/2010 | Iwai et al. |
| 2011/0038271 A1 | 2/2011 | Shin et al. |
| 2011/0096815 A1 | 4/2011 | Shin et al. |
| 2011/0098051 A1 | 4/2011 | Kamalaraj et al. |
| 2011/0098054 A1 | 4/2011 | Gorokhov et al. |
| 2012/0099527 A1 | 4/2012 | Ishi |
| 2012/0257582 A1 | 10/2012 | Damnjanovic et al. |
| 2013/0012252 A1 | 1/2013 | Suzuki et al. |
| 2013/0040689 A1 | 2/2013 | Iwai et al. |
| 2013/0077571 A1 | 3/2013 | Papasakellariou et al. |
| 2014/0071903 A1 | 3/2014 | Sorrentino et al. |

FOREIGN PATENT DOCUMENTS

| | | |
|---|---|---|
| JP | 2011-142550 A | 7/2011 |
| WO | 2009/019879 A1 | 2/2009 |
| WO | 2010/124241 A2 | 10/2010 |
| WO | 2010/125970 A1 | 11/2010 |

OTHER PUBLICATIONS

3GPP TR 36.819 V11.0.0, "3$^{rd}$ Generation Partnership Project; Technical Specification Group Radio Access Network; Coordinated multi-point operation for LTE physical layer aspects (Release 11)," 3GPP Organizational Partners, Sep. 2011, 68 pages.

ETSI TS 136 211 v10.1.0, "LTR; Evolves Universal Terrestrial Radio Access (E-UTRA); Physical channels and modulation (3GPP TS 36.211 version 10.1.0 Release 10)," European Telecommunications Standards Institute, Apr. 2011, 105 pages.

Extended European Search Report, dated Apr. 13, 2015, for European Application No. 12838410.4-1855/2765816, 7 pages.

International Search Report, dated Oct. 16, 2012, for International Application No. PCT/JP2012/005950, 4 pages.

LG Electronics, "UL sounding RS Operation," R1-080994, Agenda Item: 6.1.2, 3GPP TSG RAN WG1 #52, Sorrento, Italy, Feb. 11-15, 2008, 6 pages.

NTT DoCoMo, Fujitsu, Mitsubishi Electric, NEC, Panasonic, Sharp, Toshiba Corporation, "Necessity of Multiple Bandwidths for Sounding Reference Signals," R1-070853 (Original R1070090), Agenda Item: 6.6.2, 3GPP TSG RAN WG1 Meeting #48, St. Louis, USA, Feb. 12-16, 2007, 10 pages.

Sawahashi et al., "Coordinated Multipoint Transmission/Reception Techniques for LTE-Advanced," *IEEE Wireless Communications*, Jun. 2010, 9 pages.

Sharp, "UL RS Proposed Enhancements in Rel-11," R1-111479, Agenda Item 6.3.3, 3GPP TSG RAN WG1 Meeting #65, Barcelona, Spain, May 9-13, 2011, 2 pages.

\* cited by examiner

| SRS no. | Bandwidth, $m_{SRS,0}$ | Power offset | Period, $T_{SFC}$ | Frequency-hopping |
|---|---|---|---|---|
| 0 | 96 | 0dB | 2 | NO |
| 1 | 48 | 3dB | 2 | NO |
| 2 | 48 | 3dB | 4 | NO |
| 3 | 24 | 6dB | 2 | YES |
| 4 | 24 | 6dB | 4 | YES |
| 5 | 24 | 6dB | 8 | YES |
| 6 | 12 | 9dB | 2 | YES |
| 7 | 12 | 9dB | 4 | YES |
| 8 | 12 | 9dB | 8 | YES |
| 9 | 12 | 9dB | 16 | YES |
| ... | ... | ... | ... | ... |

FIG. 6

| Set No. | Bandwidth, $m_{SRS,0}$ | Power offset | Period, $T_{SFC}$ | Frequency-hopping |
|---|---|---|---|---|
| 0 | $\frac{96}{48}$ | 0dB<br>3dB | 2<br>4 | NO<br>NO |
| 1 | $\frac{96}{24}$ | 0dB<br>6dB | 2<br>8 | NO<br>YES |
| 2 | $\frac{96}{12}$ | 0dB<br>9dB | 2<br>4 | NO<br>YES |
| 3 | $\frac{96}{12}$ | 0dB<br>9dB | 2<br>8 | NO<br>YES |

FIG. 8

| SRS bandwidth configuration $C_{SRS}$ | SRS-bandwidth $B_{SRS}=0$ | | SRS-bandwidth $B_{SRS}=1$ | | SRS-bandwidth $B_{SRS}=2$ | | SRS-bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 2 | 4 | 1 |
| 6 | 48 | 1 | 24 | 2 | 12 | 2 | 4 | 3 |
| 7 | 48 | 1 | 16 | 3 | 8 | 2 | 4 | 2 |

FIG. 9

| srs-SubframeConfig | Configuration Period $T_{SFC}$ (subframes) | Transmission offset $\Delta_{SFC}$ (subframes) |
|---|---|---|
| 0 | 1 | {0} |
| 1 | 2 | {0} |
| 2 | 2 | {1} |
| 3 | 5 | {0} |
| 4 | 5 | {1} |
| 5 | 5 | {2} |
| 6 | 5 | {3} |
| 7 | 5 | {0, 1} |
| 8 | 5 | {2, 3} |
| 9 | 10 | {0} |
| 10 | 10 | {1} |
| 11 | 10 | {2} |
| 12 | 10 | {3} |
| 13 | 10 | {0, 1, 2, 3, 4, 6, 8} |
| 14 | 10 | {0, 1, 2, 3, 4, 5, 6, 8} |
| 15 | Reserved | Reserved |

FIG. 10

TERMINAL, BASE STATION, AND COMMUNICATION METHOD

TECHNICAL FIELD

The present invention relates to a terminal, a base station and a communication method used in a heterogeneous cell network.

BACKGROUND ART

SC-FDMA (single-carrier frequency-division multiple access) having a small PAPR (peak-to-average power ratio) and providing high power utilization efficiency for terminals has been adopted for 3GPP LTE (3rd generation partnership project long-term evolution, hereinafter simply referred to as "LTE") uplink. In the LTE uplink, SRSs (sounding reference signals) are used to obtain CSI (channel state information) including various kinds of information such as path loss and channel frequency response or the like (e.g., see Non-Patent Literature 1).

Each terminal transmits SRSs at periods set beforehand using time and frequency resources allocated beforehand. A base station measures uplink CSI based on SRSs periodically received from each terminal in a cell and references the CSI of each terminal to thereby perform frequency scheduling (resource allocation in frequency domain) of a PUSCH (physical uplink shared channel).

A wide-band LTE uplink becomes a frequency selective fading channel whose gain significantly differs depending on its frequency. Therefore, the base station allocates a PUSCH to a frequency resource having a large gain, and can thereby maintain high channel quality.

In order for the base station to perform frequency scheduling of a PUSCH, the terminal needs to transmit SRSs in all available bands.

When the terminal is located in the vicinity of the base station, the terminal transmits SRSs having a wide band and small power density. The base station can measure wideband CSI necessary for scheduling of the PUSCH by receiving only one SRS.

On the other hand, when the terminal is located far from the base station, for example, at a cell edge, a path loss in a propagation path is large, and power of a signal transmitted from the terminal thereby significantly attenuates by the time the signal arrives at the base station. Therefore, in order for the base station to obtain desired receiving quality, the terminal is required to increase transmission power.

However, transmission power of the terminal has an upper limit and increasing a power density in a wide band may cause the transmission power to exceed the upper limit value. For this reason, the terminal sends SRSs having a large power density in a narrow band (a bandwidth resulting from dividing the whole bandwidth by n, n being an integer equal to or greater than 2) a plurality of times while changing a band (frequency hopping). This allows the base station to receive a plurality of SRSs, temporally accumulate the SRSs and thereby measure CSI of the whole bandwidth necessary for PUSCH scheduling.

Note that LTE-Advanced Release 10 (hereinafter, described as "Rel. 10") which is an evolved version of LTE has introduced A-SRS (aperiodic-SRS) in addition to periodically transmitted SRS (periodic-SRS, hereinafter, referred to as "P-SRS") (e.g., see Non-Patent Literature 2). An A-SRS is transmitted from the terminal only once in response to a transmission request transmitted from the base station. Since the base station needs to transmit a transmission request to the terminal only when the base station desires to obtain CSI of a predetermined band, operation with minimized resource consumption is possible in Rel. 10.

In Release 11 which is the next LTE-Advanced version (hereinafter, described as "Rel. 11"), in a heterogeneous cell network (HetNet) as shown in FIG. 1, where there are a plurality of base stations having different cover areas, studies are being carried out on CoMP (coordinated multi-point) transmission/reception in which a plurality of base stations carry out coordinated transmission/reception (e.g., see Non-Patent Literature 3). HetNet is made up of a macro base station and pico base stations. The macro base station is a base station (node) having large transmission power and coverage, and the pico base station is a base station (node) having small transmission power and coverage. In Rel. 11 in particular, since a base station located in the vicinity of a terminal can perform reception on the uplink, it is possible to achieve high quality transmission while reducing required transmission power in the terminal compared to Rel. 10 or earlier in which only a macro base station exists.

Here, in HetNet, since transmission/reception is performed at multiple points located at greatly varying distances, it is necessary to appropriately select a base station that performs transmission/reception with a terminal (hereinafter, a base station that carries out transmission/reception to/from a terminal is called "transmission/reception participating base station") and also switch between transmission/reception participating base stations as appropriate as the terminal moves. Selection of the transmission/reception participating base station is done by the macro base station.

Studies are being carried out on the use of reference signals (CRS, CSI-RS, and SRS) transmitted on the uplink and downlink for selection and switching of transmission/reception participating base stations. When a CRS or CSI-RS transmitted on the downlink is used, the terminal measures CSI up to each base station and feeds back the measurement result using the uplink. The macro base station determines a transmission/reception participating base station based on the fed back CSI. On the other hand, when an SRS transmitted on the uplink is used, the base station can directly measure CSI using the SRS transmitted from the terminal. Therefore, it is possible to reduce the amount of information fed back from the terminal to the base station compared to a case where a CRS or CSI-RS is used.

As described above, in Rel. 11 or later in which CoMP is introduced, there is a high possibility that selection of a transmission/reception participating base station using SRSs may be adopted. In this case, an SRS is used for two applications: (1) PUSCH frequency scheduling, and in addition (2) selection of a transmission/reception participating base station.

CITATION LIST

Non-Patent Literature

NPL 1
3GPP TS36.211 v10.1.0 "3GPP TSG RAN; Evolved Universal Terrestrial Radio Access (E-UTRA); Physical Channels and Modulation"

NPL 2
3GPP TS 36.213 V10.1.0, "Physical layer procedures (Release 10)," March 2011

NPL 3
M. Sawahashi, Y. Kishiyama, A. Morimoto, D. Nishikawa, and M. Tanno, "Coordinated multipoint transmission/ reception techniques for LTE-advanced," IEEE Wireless Commun., Vol. 17, No. 3, pp. 26-34, June 2010.

NPL 4

R1-080994 LG Electronics, "UL sounding RS Operation," Feb. 11 to 15, 2008, RAN1 #52

SUMMARY OF INVENTION

Technical Problem

In order to select a transmission/reception participating base station, even a base station located far from a terminal needs to be able to receive SRSs. Therefore, an SRS which has a high power density in a narrow band is suitable for this application. To meet this application, the terminal needs to transmit SRSs at transmission periods at which the terminal can follow switching between base stations as the terminal moves.

On the other hand, in Rel. 11 or later, since a PUSCH is received by a base station located in the vicinity of a terminal, performing frequency scheduling of the PUSCH requires only the base station located in the vicinity of the terminal to be able to receive SRSs. Therefore, SRS having a low power density in a wide band is suitable for this application. To meet this application, the terminal needs to transmit SRSs at transmission periods at which the terminal can follow a channel variation.

In the Rel. 10 specification, SRSs are not assumed to be used for the above-described two applications, and SRSs are designed to be used only for frequency scheduling of PUSCHs. For this reason, using SRSs for selection of a transmission/reception participating base station requires bandwidth and transmission power to be dynamically changed.

However, dynamically changing bandwidth and transmission power may result in a problem that overhead of signaling increases significantly. Hereinafter, this problem will be described in detail.

(Switching of Bandwidth)

In the case of a P-SRS, notification from a higher layer is necessary for switching between bandwidths, which involves a considerable switching delay. Furthermore, frequent switching through notification from a higher layer is not desirable because this would drastically increase overhead.

In the case of an A-SRS, transmission of SRSs having different bandwidths can be instructed by a transmission request. However, since an A-SRS of each terminal needs to be one that does not interfere with P-SRSs/A-SRSs transmitted by other terminals, the degree of freedom in the setting is considerably limited.

(Setting and Change of Transmission Power)

In the specification of Rel. 10 or earlier, transmission power of a P-SRS or A-SRS is set so that the power density becomes constant irrespective of its bandwidth. Therefore, it is not possible to provide different power densities for SRSs of different bandwidths.

Closed-loop control using a TPC (transmit power control) command is used to change transmission power. A TPC command is a command composed of 2 bits that instructs to increase/decrease transmission power by a predetermined step width.

To significantly change a power density, the macro base station needs to transmit a plurality of TPC commands to the terminal. In consideration of the fact that power densities of a P-SRS and A-SRS are constant irrespective of their bandwidths, even if SRSs of different bandwidths are transmitted using a combination of P-SRS and A-SRS, it is necessary to frequently adjust power using TPC commands in order to set the SRSs to different power densities. Such frequent transmission of TPC commands may lead to a great increase in overhead.

As a method using a plurality of types of SRSs having different bandwidths, one proposed in Non-Patent Literature 4 is known for example. This method provides a plurality of types of P-SRSs having different periods, frequency positions and frequency shifts per certain bandwidth, selects one or a plurality of P-SRSs as required, and multiplexes and transmits the P-SRSs. This method can select P-SRSs in a continuous band to increase an apparent P-SRS bandwidth or select P-SRSs of different periods to change an apparent P-SRS bandwidth. However, the technique described in Non-Patent Literature 4 presents neither transmission power control for changing a power density nor method for achieving different coverages in one P-SRS set.

An object of the present invention is to provide, in a HetNet, a terminal, a base station and a communication method capable of transmitting a P-SRS (or A-SRS) at transmission periods necessary to perform processing of both selection of a transmission/reception participating base station and PUSCH frequency scheduling.

Solution to Problem

A terminal according to an aspect of the present invention includes: a receiving section that receives control information including information indicating a transmission parameter of a periodic sounding reference signal (P-SRS); and a transmitting section that transmits a first P-SRS having a first bandwidth and a first power density at a first period and transmits a second P-SRS having a second bandwidth narrower than the first bandwidth and a second power density higher than the first power density at a second period, using the transmission parameter included in the received control information.

A terminal according to an aspect of the present invention includes: a receiving section that receives control information including information indicating a transmission parameter of an aperiodic sounding reference signal (A-SRS); and a transmitting section that transmits a first A-SRS having a first bandwidth and a first power density during a first period only when a transmission request is made from a base station, and transmits a second A-SRS having a second bandwidth narrower than the first bandwidth and a second power density higher than the first power density during a second period only when a transmission request is made from the base station, using the transmission parameter in the received control information.

A base station according to an aspect of the present invention includes: a transmitting section that transmits control information including information indicating a transmission parameter of a periodic sounding reference signal (P-SRS); a receiving section that receives a first P-SRS having a first bandwidth and a first power density and a second P-SRS having a second bandwidth narrower than the first bandwidth and a second power density higher than the first power density; a measuring section that measures channel state information (CSI) using the received first P-SRS and second P-SRS; and a selection section that performs frequency scheduling using the CSI based on the first P-SRS and the second P-SRS and that selects a base station which participates in transmission/reception, using the CSI based on the second P-SRS.

A base station according to an aspect of the present invention includes: a transmitting section that transmits control information including information indicating a transmission parameter of an aperiodic sounding reference signal (A-SRS); a receiving section that receives a first A-SRS having a first bandwidth and a first power density and a second A-SRS having a second bandwidth narrower than the first bandwidth and a second power density higher than the first power density; a measuring section that measures channel state information (CSI) using the received first A-SRS and second A-SRS; and a selection section that performs frequency scheduling using the CSI based on the first A-SRS and the second A-SRS, and that selects a base station which participates in transmission/reception, using the CSI based on the second A-SRS.

A communication method according to an aspect of the present invention includes: receiving control information including information indicating a transmission parameter of a periodic sounding reference signal (P-SRS); and transmitting a first P-SRS having a first bandwidth and a first power density at a first period using the transmission parameter in the received control information; and transmitting a second P-SRS having a second bandwidth narrower than the first bandwidth and a second power density higher than the first power density at a second period using the transmission parameter in the received control information.

A communication method according to an aspect of the present invention includes: receiving control information including information indicating a transmission parameter of an aperiodic sounding reference signal (A-SRS); transmitting a first A-SRS having a first bandwidth and a first power density during a first period only when a transmission request is made from a base station, using the transmission parameter in the received control information; and transmitting a second A-SRS having a second bandwidth narrower than the first bandwidth and a second power density higher than the first power density during a second period only when a transmission request is made from the base station, using the transmission parameter in the received control information.

Advantageous Effects of Invention

According to the present invention, a terminal periodically time-division-multiplexes and transmits two types of SRSs: a wide-band and low power density P-SRS (or A-SRS) and a narrow-band and high power density P-SRS (or A-SRS), based on a transmission parameter indicated from a macro base station, and can thereby transmit the P-SRS (or A-SRS) at a transmission period necessary for performing processing of both selection of a transmission/reception participating base station and PUSCH frequency scheduling.

BRIEF DESCRIPTION OF DRAWINGS

FIG. 6 illustrates an example of a table listing P-SRS candidates according to Embodiment 1 of the present invention;

FIG. 8 illustrates another example of a table listing P-SRS candidates according to Embodiment 1 of the present invention;

FIG. 9 illustrates a table of SRS bandwidths and frequency hopping defined in Rel. 10;

FIG. 10 illustrates a table of SRS period offsets and time offsets defined in Rel. 10;

DESCRIPTION OF EMBODIMENTS

Figure 1:
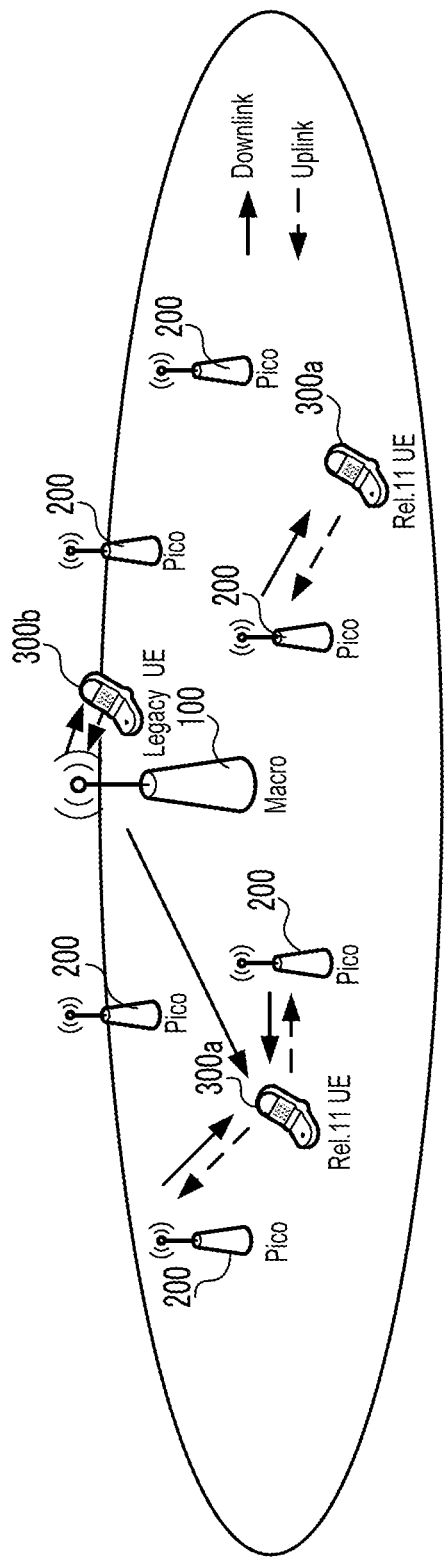
FIG. 1 is a conceptual diagram of a cell according to Rel. 11.

Hereinafter, embodiments of the present invention will be described in detail with reference to the accompanying drawings. Note that the same components among the embodiments will be assigned the same reference numerals and detailed description thereof will be omitted.

Embodiment 1

Configuration of Network System

A network system according to Embodiment 1 of the present invention is a HetNet and is made up of macro base station (Macro eNB) 100, pico base station (Pico eNB) 200, and terminal (UE) 300 as shown in FIG. 1. One macro base station 100 and one or a plurality of pico base stations 200 are installed in each cell. Macro base station 100 and each pico base station 200 are connected via a low-delay and large-capacity interface such as an optical fiber. Macro base station 100 and each pico base station 200 in a cell use an identical cell ID, share a transmission parameter of SRSs allocated to each terminal 300 located in the cell, receive the SRSs and measure CSI. Each terminal 300 performs radio communication with macro base station 100 and/or pico base station 200 selected by macro base station 100.

In each terminal 300, a base station that transmits data may be different from a base station that receives data. Macro base station 100 can communicate with both terminal 300a compliant with the Rel. 11 specification and terminal 300b compliant with the specification of Rel. 10 or earlier. In the following description, terminal 300 compliant with the Rel. 11 specification (terminal 300a in FIG. 1) will be described.

In the present embodiment, each terminal 300 periodically time-division-multiplexes and transmits two types of SRSs: a first P-SRS having a wide-band and low power density and a second P-SRS having a narrow-band and high power density based on transmission parameters notified from macro base station 100.

[Configuration of Macro Base Station]

Figure 2:
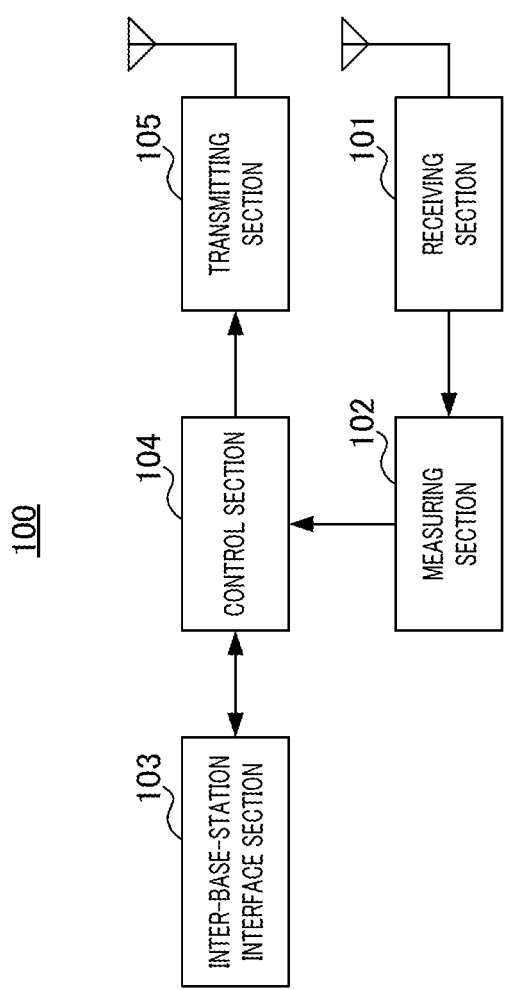
FIG. 2 is a block diagram illustrating a configuration of main components of a macro base station according to Embodiment 1 of the present invention.

FIG. 2 is a block diagram illustrating a configuration of main components of macro base station 100 according to the present embodiment. Macro base station 100 shown in FIG. 2 is mainly constructed of receiving section 101, measuring section 102, inter-base-station interface (IF) 103, control section 104 and transmitting section 105.

Receiving section 101 performs radio reception processing (down-conversion, demodulation, decoding or the like) on a radio signal transmitted from each terminal 300 and received via an antenna and extracts a P-SRS, PUSCH, uplink control signal (PUCCH: physical uplink control channel) or the like. Receiving section 101 outputs the P-SRS to measuring section 102. When terminal 300 is located in the vicinity of macro base station 100, receiving section 101 extracts both a first P-SRS and a second P-SRS. On the other hand, when terminal 300 is located far from macro base station 100, receiving section 101 extracts a second P-SRS.

Measuring section 102 measures CSI using a P-SRS and outputs the measurement result to control section 104. When terminal 300 is located in the vicinity of macro base station 100, measuring section 102 measures CSI using the first P-SRS and second P-SRS respectively. On the other hand, when terminal 300 is located far from macro base station 100, measuring section 102 measures CSI using the second P-SRS.

Inter-base-station interface 103 carries out wired communication with pico base station 200. More specifically, inter-base-station interface 103 transmits information indicating an instruction on participation in transmission/reception to a transmission/reception participating base station selected by control section 104. Inter-base-station interface 103 transmits scheduling information and PUSCH transmission parameters of terminal 300 to pico base station 200 that receives a PUSCH. Inter-base-station interface 103 also receives the CSI measurement result transmitted from pico base station 200 and transfers the CSI measurement result to control section 104. Inter-base-station interface 103 receives data from terminal 300 transferred from pico base station 200.

Control section 104 performs various types of controls such as frequency scheduling of the PUSCH or selection of a transmission/reception participating base station. More specifically, control section 104 selects, as a first P-SRS, a P-SRS having a wide band, low power density and a transmission period capable of following a channel variation, and selects, as a second P-SRS, a P-SRS having a narrow band, high power density and transmission period capable of following switching between base stations as terminal 300 moves, from among a plurality of P-SRS candidates having mutually different transmission parameters (bandwidth, power offset, period and the presence or absence of frequency hopping). The P-SRS candidates are listed and stored in a table and each P-SRS candidate is assigned a number. Control section 104 transmits information on a number indicating the selected two types of P-SRSs (hereinafter referred to as "P-SRS selection set") and information indicating transmission timing of the two types of P-SRSs to terminal 300 via transmitting section 105 and transmits the information to each pico base station 200 via inter-base-station interface 103.

Control section 104 calculates an SINR based on CSI reported from each pico base station 200 via inter-base-station interface 103 and CSI outputted from measuring section 102 and selects a base station (transmission/reception participating base station) that participates in downlink transmission or uplink reception based on the SINR. Control section 104 then transmits information on the selected transmission/reception participating base station to terminal 300 via transmitting section 105 and transmits the information to each pico base station 200 via inter-base-station interface 103.

When macro base station 100 itself participates in PUSCH reception, control section 104 performs PUSCH frequency scheduling and determines PUSCH transmission parameters of terminal 300 based on the CSI measurement result of the first P-SRS outputted from measuring section 102 and the CSI measurement result of the first P-SRS reported from pico base station 200 participating in PUSCH reception via inter-base-station interface 103. On the other hand, when macro base station 100 itself does not participate in PUSCH reception, control section 104 performs PUSCH frequency scheduling and determines PUSCH transmission parameters of terminal 300 based on the CSI measurement result of the first P-SRS reported from pico base station 200 participating in PUSCH reception via inter-base-station interface 103. Control section 104 transmits information indicating the PUSCH frequency scheduling result and information indicating the PUSCH transmission parameters of terminal 300 to terminal 300 via transmitting section 105 and transmits the information to pico base station 200 participating in PUSCH reception via inter-base-station interface 103.

Note that the CSI measurement result of the second P-SRS may vary under the influence of channel frequency selectivity. In order to reduce the influence, frequency hopping is introduced. Control section 104 can perform successive averaging on CSI measured by second P-SRS in each pico base station 200. For example, by time-averaging CSI measured every time one second P-SRS is newly received, it is possible to follow CSI variations caused by movement of terminal 300 or the like while preventing the CSI variations.

Transmitting section 105 performs radio transmission processing (coding, modulation, up-conversion or the like) on a P-SRS selection set outputted from control section 104 and various kinds of information (information indicating the transmission/reception participating base station, information indicating the PUSCH scheduling result, information indicating PUSCH transmission parameters of terminal 300 or the like), PDSCH (physical downlink shared channel), and downlink control signal (PDCCH: physical downlink control channel) or the like and transmits the resultant signal to each terminal 300 via an antenna. The P-SRS selection set may be notified as terminal-specific RRC control information or may be included in the MAC header.

[Configuration of Pico Base Station]

Figure 3:
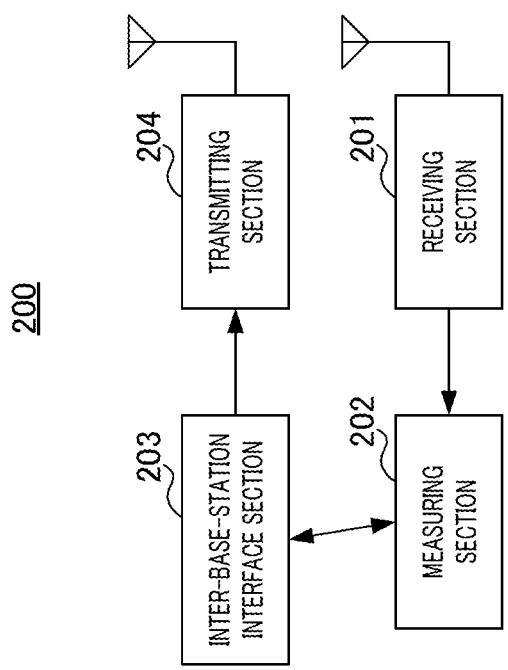
FIG. 3 is a block diagram illustrating a configuration of main components of a pico base station according to Embodiment 1 of the present invention.

FIG. 3 is a block diagram illustrating a configuration of main components of pico base station 200 according to the present embodiment. Pico base station 200 shown in FIG. 3 is mainly constructed of receiving section 201, measuring section 202, inter-base-station interface section 203, and transmitting section 204.

Receiving section 201 performs radio reception processing on a radio signal transmitted from each terminal 300 and received via an antenna, extracts a P-SRS and a control signal or the like and outputs the P-SRS to measuring section 202. When instructed from macro base station 100 to participate in PUSCH reception, receiving section 201 processes a PUSCH included in the received signal according to a PUSCH transmission parameter of terminal 300 instructed from macro base station 100. When terminal 300 is located in the vicinity of pico base station 200, receiving section 201 extracts both a first P-SRS and a second P-SRS. On the other hand, when terminal 300 is located far from pico base station 200, receiving section 201 extracts a second P-SRS.

Measuring section 202 measures CSI using the P-SRS and transmits the measurement result to macro base station 100 via inter-base-station interface section 203. When terminal 300 is located in the vicinity of pico base station 200, measuring section 202 measures CSI using the first P-SRS and second P-SRS respectively. On the other hand, when terminal 300 is located far from pico base station 200, measuring section 202 measures CSI using the second P-SRS.

Inter-base-station interface section 203 carries out wired communication with macro base station 100. More specifically, inter-base-station interface section 203 receives a P-SRS selection set transmitted from macro base station 100 and transfers the P-SRS selection set to measuring section 202. Inter-base-station interface section 203 transmits the CSI measurement result outputted from measuring section 202 to macro base station 100. Inter-base-station interface section 203 also receives information indicating an instruction on participation in transmission/reception from macro base station 100. When instructed to participate in PUSCH reception, inter-base-station interface section 203 transmits a PUSCH received from terminal 300 to macro base station 100.

When instructed to participate in PDSCH transmission from macro base station 100, transmitting section 204 performs radio transmission processing on the PDSCH according to transmission parameters instructed from macro base station 100 and transmits the processed signal to each terminal 300 via an antenna.

[Configuration of Terminal]

Figure 4:
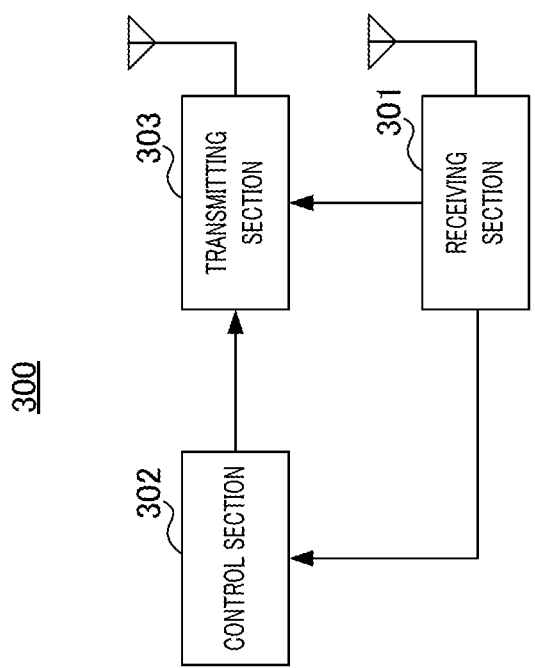
FIG. 4 is a block diagram illustrating a configuration of main components of a terminal according to Embodiment 1 of the present invention.

FIG. 4 is a block diagram illustrating a configuration of main components of terminal 300 according to the present embodiment. Terminal 300 shown in FIG. 4 is mainly constructed of receiving section 301, control section 302 and transmitting section 303.

Receiving section 301 performs radio reception processing on a radio signal transmitted from macro base station 100 and pico base station 200 and received via an antenna, extracts information indicating a P-SRS selection set and a transmission/reception participating base station, information indicating a PUSCH scheduling result, information indicating PUSCH transmission parameters of terminal 300, PDSCH and downlink control signal or the like, and outputs information indicating a P-SRS selection set and PUSCH scheduling result, and information indicating PUSCH transmission parameters of terminal 300 to control section 302.

In accordance with the P-SRS selection set outputted from receiving section 301, control section 302 instructs transmitting section 303 about transmission parameters (bandwidth, power offset, period, and the presence or absence of frequency hopping) of a first P-SRS and a second P-SRS. In accordance with information indicating the PUSCH scheduling result and information on transmission parameters of terminal 300 outputted from receiving section 301, control section 302 indicates PUSCH transmission parameters to transmitting section 303.

Transmitting section 303 performs radio transmission processing on the first P-SRS, second P-SRS, PUSCH, uplink control signal or the like and transmits the processed signal to each terminal 300 via an antenna. Transmitting section 303 performs radio transmission processing on the first P-SRS, second P-SRS and PUSCH in accordance with the transmission parameters indicated from control section 302.

Terminal 300 performs transmission power control on the first P-SRS, second P-SRS and PUSCH. More specifically, terminal 300 first performs open-loop transmission power control in accordance with a path loss in the propagation path between base station 100 or 200 which is a communicating party and terminal 300, and then performs closed-loop transmission power control using a TPC command transmitted from base station 100 or 200.

[Operation Flow]

Figure 5:
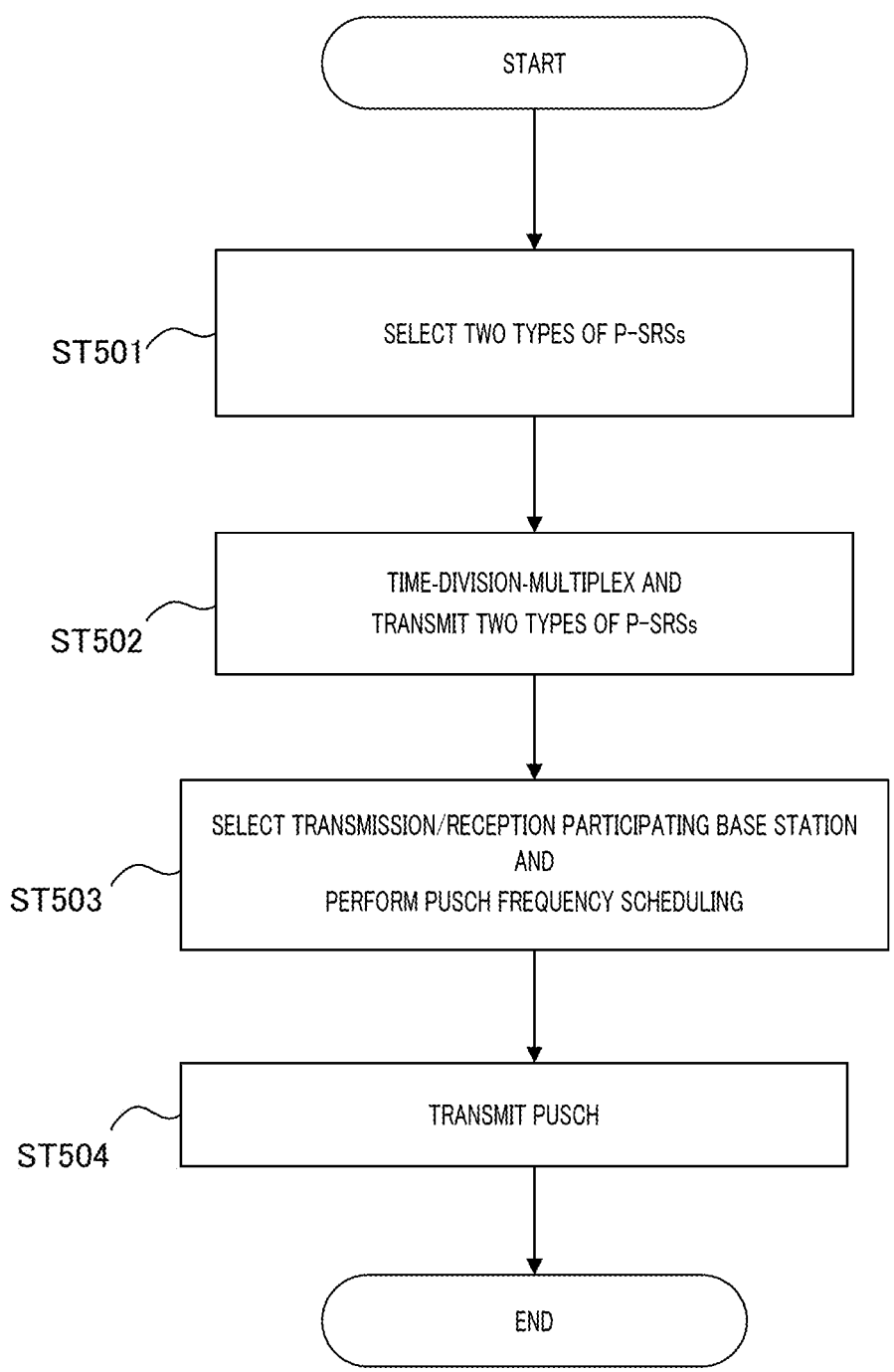
FIG. 5 is a flowchart illustrating a main processing procedure of each apparatus according to Embodiment 1 of the present invention.

Next, a main processing procedure of each apparatus according to the present embodiment will be described using FIG. 5.

First, macro base station 100 selects two types of P-SRSs: a first P-SRS having a wide-band and low power density and a second P-SRS having a narrow band and high power density from among P-SRS candidates described in a list as shown in FIG. 6. Macro base station 100 transmits, to terminal 300, a P-SRS selection set which is information on numbers indicating the selected two types of P-SRSs (ST501).

Figure 7:
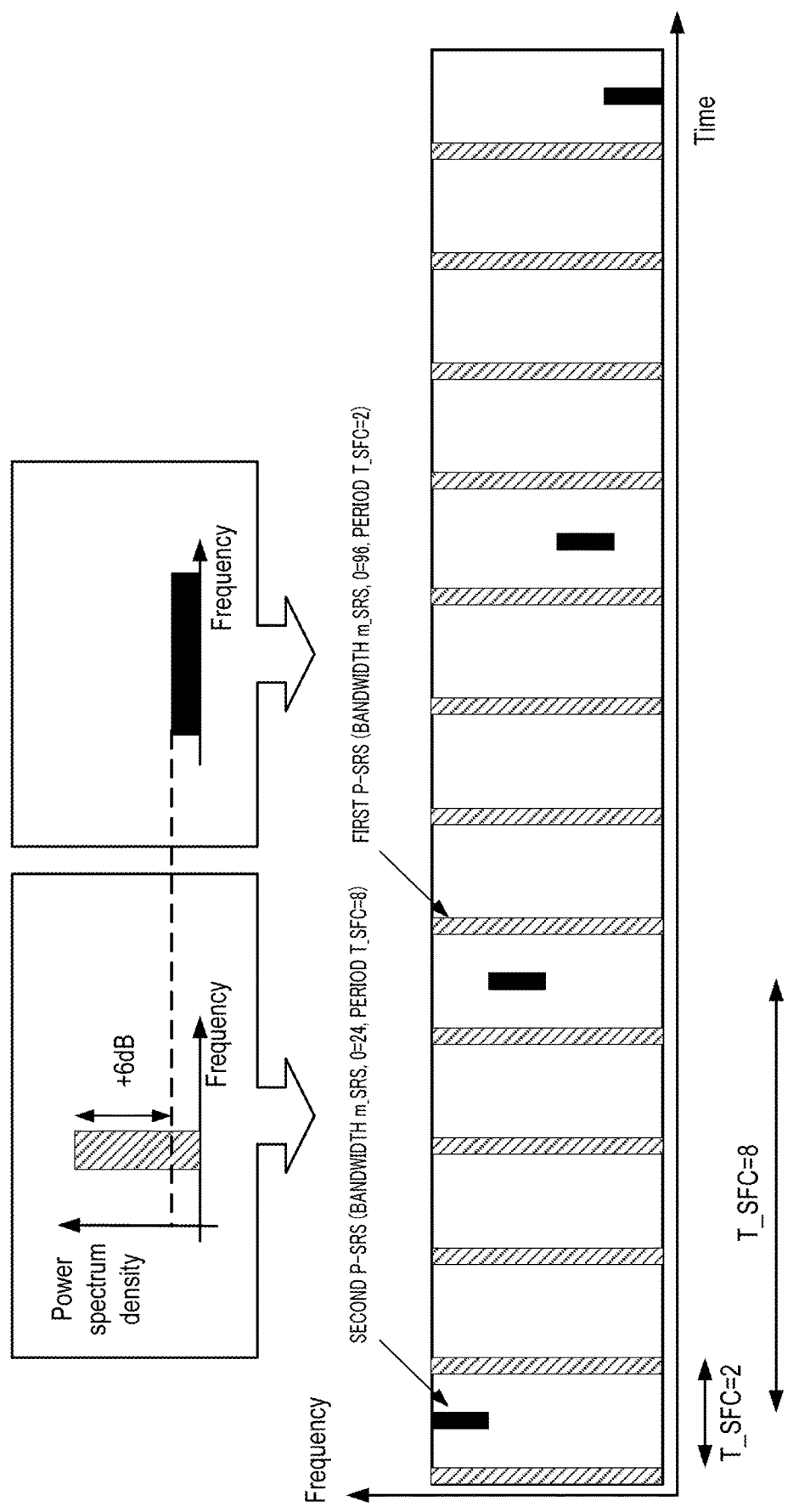
FIG. 7 illustrates an example of P-SRSs transmitted from the terminal according to Embodiment 1 of the present invention.

Next, terminal 300 sets transmission resources of the first P-SRS and the second P-SRS based on the P-SRS selection set received from macro base station 100. Terminal 300 then time-division-multiplexes and transmits the first P-SRS and second P-SRS to respective base stations 100 and 200 according to the set transmission resources (ST502). For example, in FIG. 6, when SRS no. 0 is selected as the first P-SRS and SRS no. 5 is selected as the second P-SRS, terminal 300 transmits the first P-SRS and the second P-SRS based on transmission parameters (band, transmission timing, and period) as shown in FIG. 7.

Next, respective base stations 100 and 200 measure CSIs using the received P-SRSs. Macro base station 100 then performs PUSCH frequency scheduling and determines transmission parameters based on the CSIs measured in respective base stations 100 and 200. Macro base station 100 also calculates an SINR based on the CSI measured in respective base stations 100 and 200 and selects a transmission/reception participating base station based on the SINR. Macro base station 100 then notifies terminal 300 and each pico base station 200 of information indicating the selected transmission/reception participating base station. Macro base station 100 further notifies terminal 300 and pico base station 200 participating in PUSCH reception of PUSCH frequency scheduling and PUSCH transmission parameters (ST503).

Next, terminal 300 transmits a PUSCH based on the notified PUSCH transmission parameters (ST504).

Macro base station 100 continues monitoring CSI measurement results of respective base stations 100 and 200, switches the transmission/reception participating base station and changes frequency resources for PUSCH scheduling in accordance with a change in the CSI measurement results.

[Effects]

As described above, in the present embodiment, terminal 300 time-division-multiplexes and transmits two types of SRSs: a first P-SRS having a wide-band and low power density and a second P-SRS having a narrow-band and high power density based on the transmission parameters notified from macro base station 100. This makes it possible to transmit P-SRSs at transmission periods necessary to perform processing of both selection of a transmission/reception participating base station and PUSCH frequency scheduling.

[Variation 1]

In the present embodiment, as shown in FIG. 8, a combination of P-SRS candidates which is likely to be selected as a pair of the first P-SRS and second P-SRS or a combination of P-SRS candidates which has a high effect of being selected as a pair of the first P-SRS and second P-SRS may be selected beforehand. In this case, instead of assigning a number to each P-SRS candidate, a number may be assigned to each combination of P-SRS candidates ("Set. No" in FIG. 8).

In this case, it is possible to reduce overhead necessary for macro base station 100 to notify terminal 300 of the selected P-SRS.

[Variation 2]

Note that the bandwidth, period, frequency hopping pattern or the like of an SRS are already defined in the Rel. 10 specification. Thus, in the present embodiment, instead of creating a new table, macro base station 100 may select two types of P-SRSs from an already existing SRS list of Rel. 10. For example, macro base station 100 selects two types of P-SRSs which do not collide with each other from tables in FIG. 9 and FIG. 10. In this case, however, power offset information for differentiating coverage of the two types of P-SRSs needs to be separately notified from terminal-specific RRC control information or the MAC header or the like.

In this case, since the P-SRSs to be transmitted are a combination of P-SRSs used by a terminal of Rel. 10 or earlier with a power offset, it is possible to easily realize coexistence (orthogonal multiplexing) with a terminal of Rel. 10 or earlier.

[Variation 3] In the present embodiment, terminal 300 may determine power offsets of two types of P-SRSs based on the following equation.

(Equation 1)

$$P_{W-SRS,c}(i) = \min \begin{cases} P_{CMAX,c}(i), \\ P_{SRS\_OFFSET,c}(i) + 10\log_{10}(M_{W-SRS,c}) + \\ P_{O\_PUSCH,c}(j) + \alpha_c(j) \cdot PL_c + f_c(i) \end{cases} \text{[dBm]} \quad [1]$$

$$P_{N-SRS,c}(i) = P_{W-SRS,c}(i) \text{ [dBm]}$$

In equation 1 above, $P_{W-SRS,c}(i)$ is transmission power of the first P-SRS and is the same as the power equation defined in Rel. 10. $P_{N-SRS,c}(i)$ is transmission power of the second P-SRS. Equation 1 above expresses that the transmission power of the first P-SRS is defined based on the power equation of Rel. 10 and the second P-SRS is assumed to have the same transmission power with reference to this. Transmission power is given by bandwidth×power density. Therefore, for example, when the bandwidth of the second P-SRS is ¼ of that of the first P-SRS, the power density of the second P-SRS is four times that of the first P-SRS.

In this case, terminal 300 can transmit two types of P-SRSs having different bandwidths and power densities and form two different coverages without notifying terminal 300 of the power offsets from macro base station 100.

[Variation 4]

Figure 11:
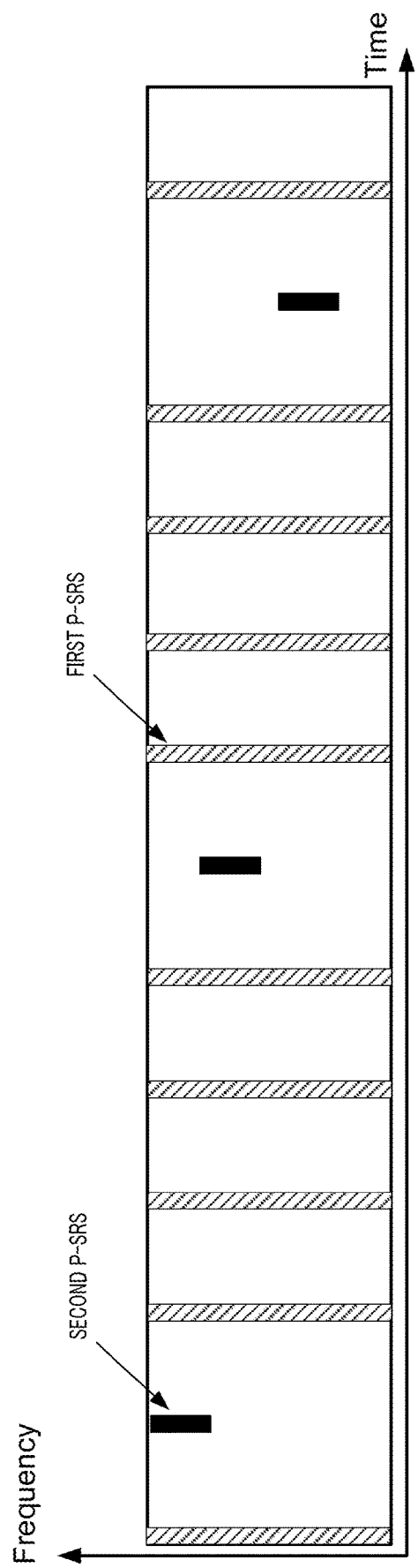
FIG. 11 illustrates another example of P-SRSs transmitted from the terminal according to Embodiment 1 of the present invention.

In the present embodiment, terminal 300 may periodically stop transmission of some of the first P-SRSs as shown in FIG. 11 and transmit the second P-SRSs instead. In this case, the P-SRS transmission period can be kept constant.

Embodiment 2

Embodiment 2 will describe a case where closed-loop transmission power control is respectively performed on two types of P-SRSs transmitted by terminal 300. A configuration of a network system in Embodiment 2 is the same as that in Embodiment 1. In Embodiment 2, main configurations of macro base station 100, pico base station 200, and terminal 300 are the same as those in Embodiment 1. Embodiment 2 is different from Embodiment 1 in respective functions of control section 104 and transmitting section 105 of macro base station 100, and receiving section 301 and control section 302 of terminal 300.

[Additional Function of Macro Base Station]

In the present embodiment, control section 104 of macro base station 100 performs the processing described in Embodiment 1, and further generates a TPC command (2 bits) of a downlink control signal (PDCCH) based on a comparison in magnitude between a target SINR and an SINR of a received P-SRS and outputs the TPC command to transmitting section 105. Control section 104 outputs a PDCCH to transmitting section 105 and controls transmitting section 105 so that the TPC command is transmitted at timing applied to a desired P-SRS.

Transmitting section 105 performs the processing described in Embodiment 1 and further transmits a PDCCH including a TPC command based on an instruction from control section 104.

In the present embodiment, a signal to which a TPC command is applied changes in accordance with a time during which macro base station 100 transmits the TPC command. The relationship between the transmission time of the TPC command and the signal to which the TPC command is applied is determined between macro base station 100 and terminal 300.

Figure 12:
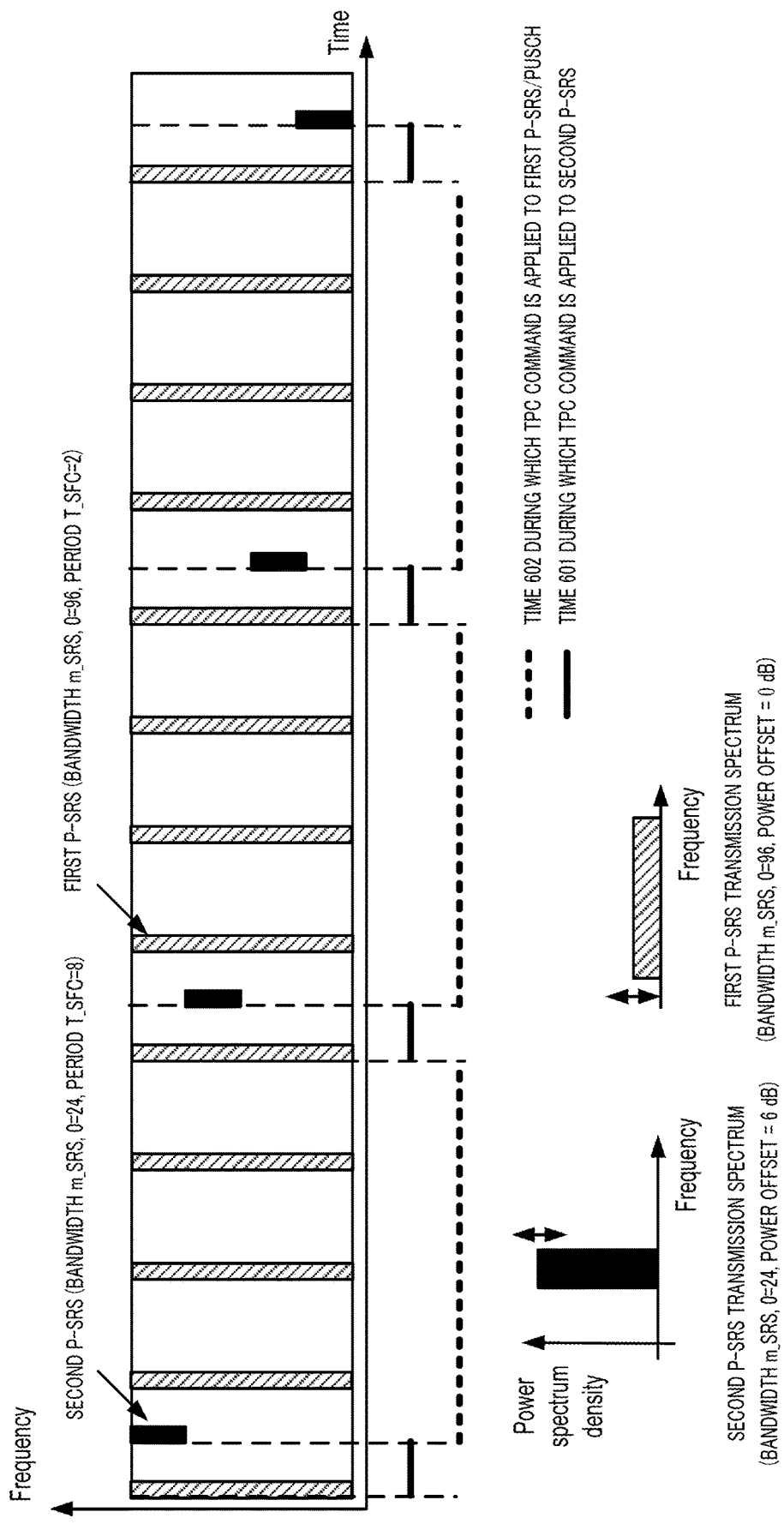
FIG. 12 illustrates an example of P-SRSs transmitted from a terminal and a transmission power control time according to Embodiment 2 of the present invention.

In an example of FIG. 12, only a TPC command transmitted from macro base station 100 during time 601 between a transmission timing of a first P-SRS transmitted immediately before a second P-SRS and a transmission timing of a second P-SRS is applied to closed-loop control of the second P-SRS, and a TPC command transmitted from macro base station 100 during other time 602 is applied to closed-loop control of the first P-SRS and PUSCH.

[Additional Function of Terminal]

Receiving section 301 of terminal 300 performs the processing described in Embodiment 1, and further extracts a PDCCH including a TPC command from the received signal and outputs the TPC command to control section 302.

Control section 302 performs the processing described in Embodiment 1. Control section 302 monitors timings at which receiving section 301 receives a PDCCH and determines a target signal to which a TPC command included in the PDCCH is applied. Control section 302 then performs the transmission power control instructed by the TPC command on the target signal to which the TPC command is applied.

[Effects]

In addition to the effects of Embodiment 1, the present embodiment achieves an effect of being able to independently perform a plurality of types of closed-loop power controls while minimizing the expansion of TPC commands. For example, according to the present embodiment, a TPC command of Rel. 10 can also be used as is. Of a first P-SRS, a second P-SRS and a PUSCH, the second P-SRS is a signal intended to be received at base station 100 or 200 located far from terminal 300, and the first P-SRS and PUSCH are signals intended to be received at base station 100 or 200 located in the vicinity of terminal 300. Therefore, in the present embodiment, two mutually independent types of controls: closed-loop control of the second P-SRS and closed-loop control of linking both the first P-SRS and PUSCH may be performed as shown in FIG. 12. In the present embodiment, signals to which a TPC command is applied can be weighted by changing a combination of periods of two types of P-SRSs. In the example of FIG. 12, time 602 during which the TPC command is applied to the first P-SRS and PUSCH is seven times as long as time 601 during which the TPC command is applied to the second P-SRS.

[Variation 1]

In the present embodiment, signals to which a TPC command is applied can also be switched by a frequency resource (search space) to which a PDCCH including a TPC command is mapped. In this case, a plurality of types of controls can be performed without causing any temporal constraints.

[Variation 2]

Figure 13:
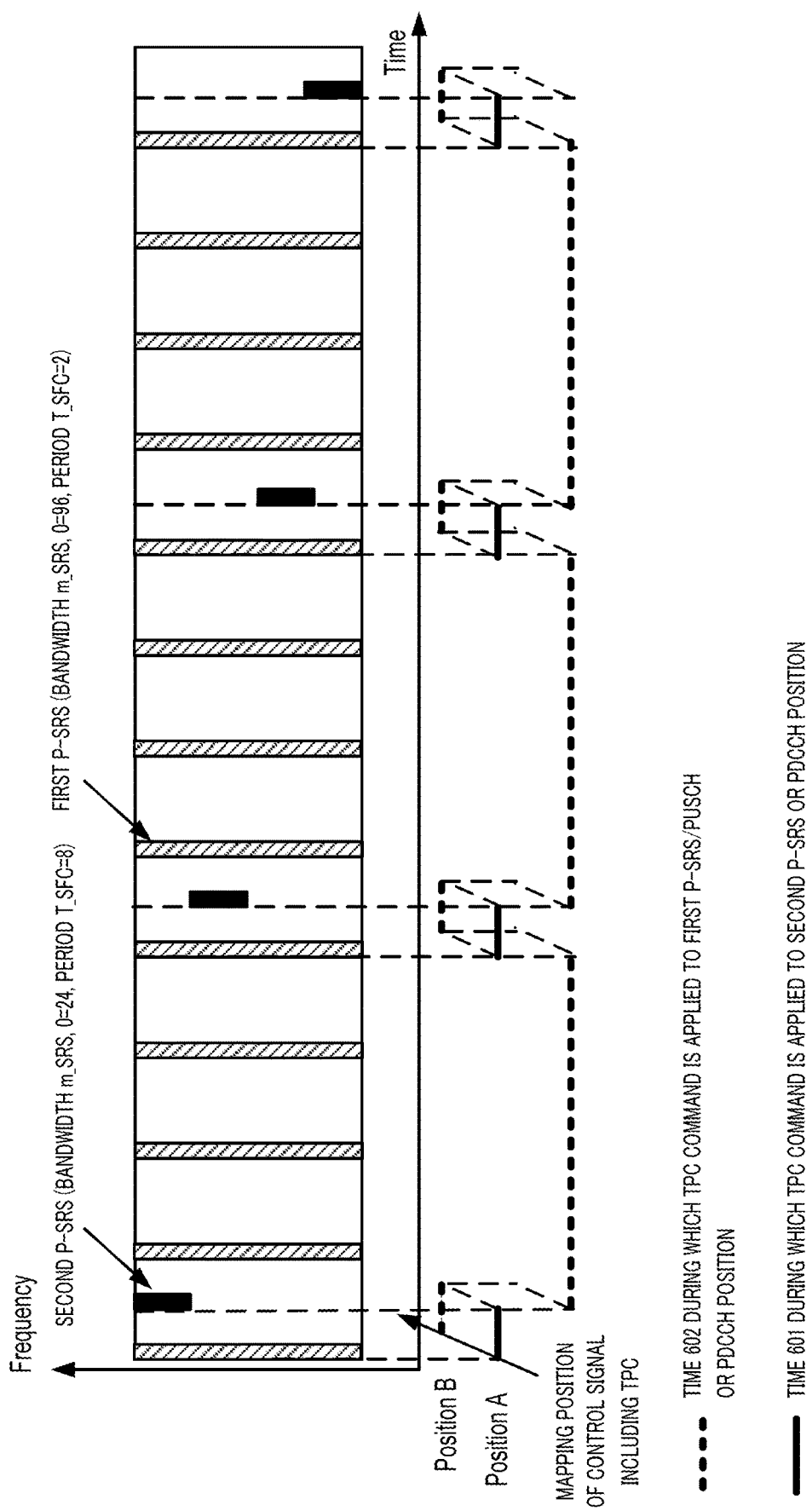
FIG. 13 illustrates another example of P-SRSs transmitted from the terminal and a transmission power control time according to Embodiment 2 of the present invention.

In the present embodiment, it is possible to introduce closed-loop controls, and then provide a plurality of frequency resources to which a PDCCH is mapped, and switch between the types of controls in accordance with a time during which a PDCCH including a TPC command is transmitted/received and a frequency resource by which a PDCCH including a TPC command is transmitted/received. In addition, differences as being superior or inferior to each other may be set in time and frequency. For example, signals to which a TPC command is applied are normally switched using time division in the same way as in FIG. 12. However, for time 601 during which the TPC command is applied to the second P-SRS, only when power of the first P-SRS and PUSCH is adjusted, a control signal including the TPC command is mapped to a position of a specific frequency resource (search space). That is, during time 601, a control signal for adjusting power of the second P-SRS and a control signal for adjusting power of the first P-SRS and PUSCH may be multiplexed on a frequency resource and may be transmitted temporally at the same time. For example, as shown in FIG. 13, for time 601 during which a TPC command is applied to the second P-SRS, a control signal including the TPC command is mapped to position B of the frequency resource only when power of the first P-SRS and PUSCH is adjusted. Thus, for time 601 during which a TPC command is applied to the second P-SRS, a control signal for adjusting power of the second P-SRS mapped to position A of the frequency resource and a control signal for adjusting power of the first P-SRS and PUSCH mapped to position B of the frequency resource are multiplexed on the frequency resource and transmitted temporally at the same time. This indicates a case where a control signal is mapped to a specific frequency resource only when driven out of necessity while giving priority to switching between signals to which a TPC command is applied using time division.

[Variation 3]

For terminal 300 which has sufficiently high quality of connection with base station 100 or 200 and has a moderate CSI variation, base station 100 can sufficiently perform processing of both selection of a transmission/reception participating base station and PUSCH frequency scheduling if only base station 100 can receive a first P-SRS. For such terminal 300, in Embodiments 1 and 2 above, the present invention may stop transmission of the second P-SRS only when terminal 300 receives a transmission request for a specific A-SRS (hereinafter, referred to as "A-SRS trigger") at a specific timing.

Figure 14:
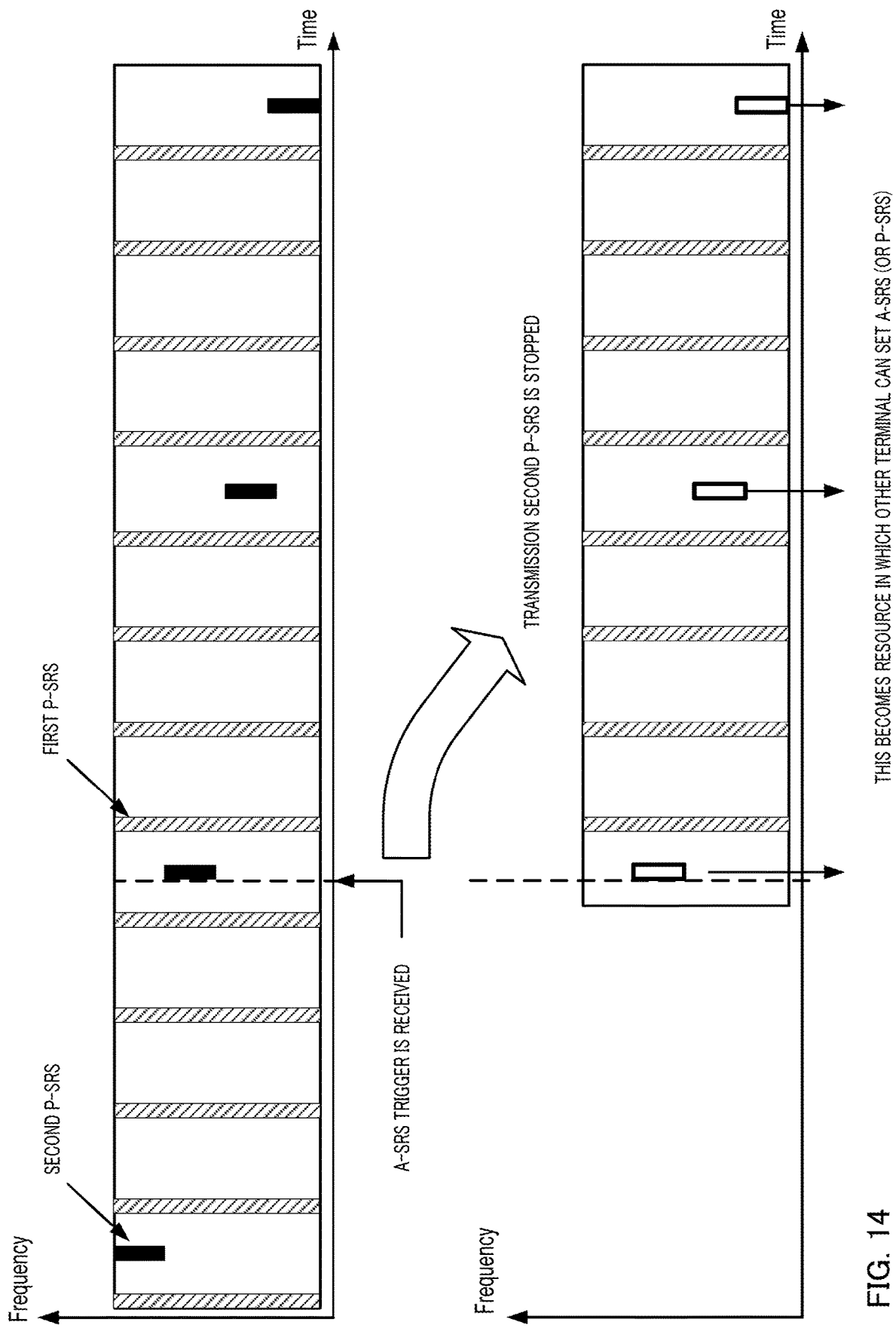
FIG. 14 illustrates an example of P-SRSs transmitted from a terminal according to another embodiment of the present invention.

For example, as shown in FIG. 14, when terminal 300 receives an A-SRS trigger which instructs that an A-SRS having the same bandwidth as that of the second P-SRS currently being transmitted should be transmitted at the same timing as the second P-SRS, terminal 300 stops transmission of the second P-SRS thereafter.

Figure 15:
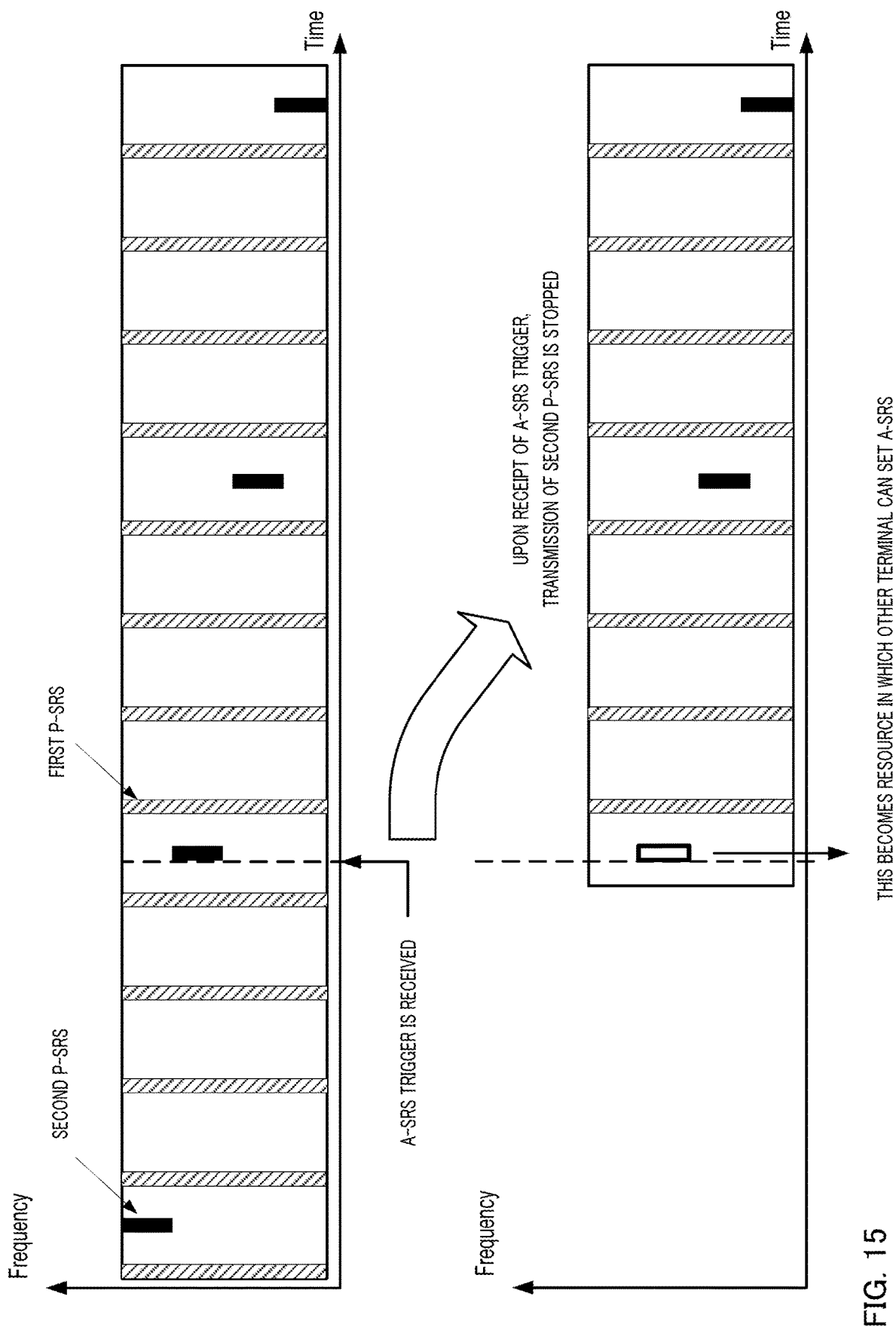
FIG. 15 illustrates another example of P-SRSs transmitted from a terminal according to a further embodiment of the present invention.

Alternatively as shown in FIG. 15, when terminal 300 receives the above-described A-SRS trigger, terminal 300 stops transmission of the second P-SRS only at that timing.

In this way, when there is a shortage of SRS resources such as when the number of terminals increases drastically or when A-SRSs are desired to be transmitted to many terminals, second P-SRS resources can be released, making it possible to solve the problem of the shortage of resources.

[Variation 4]

Figure 16:
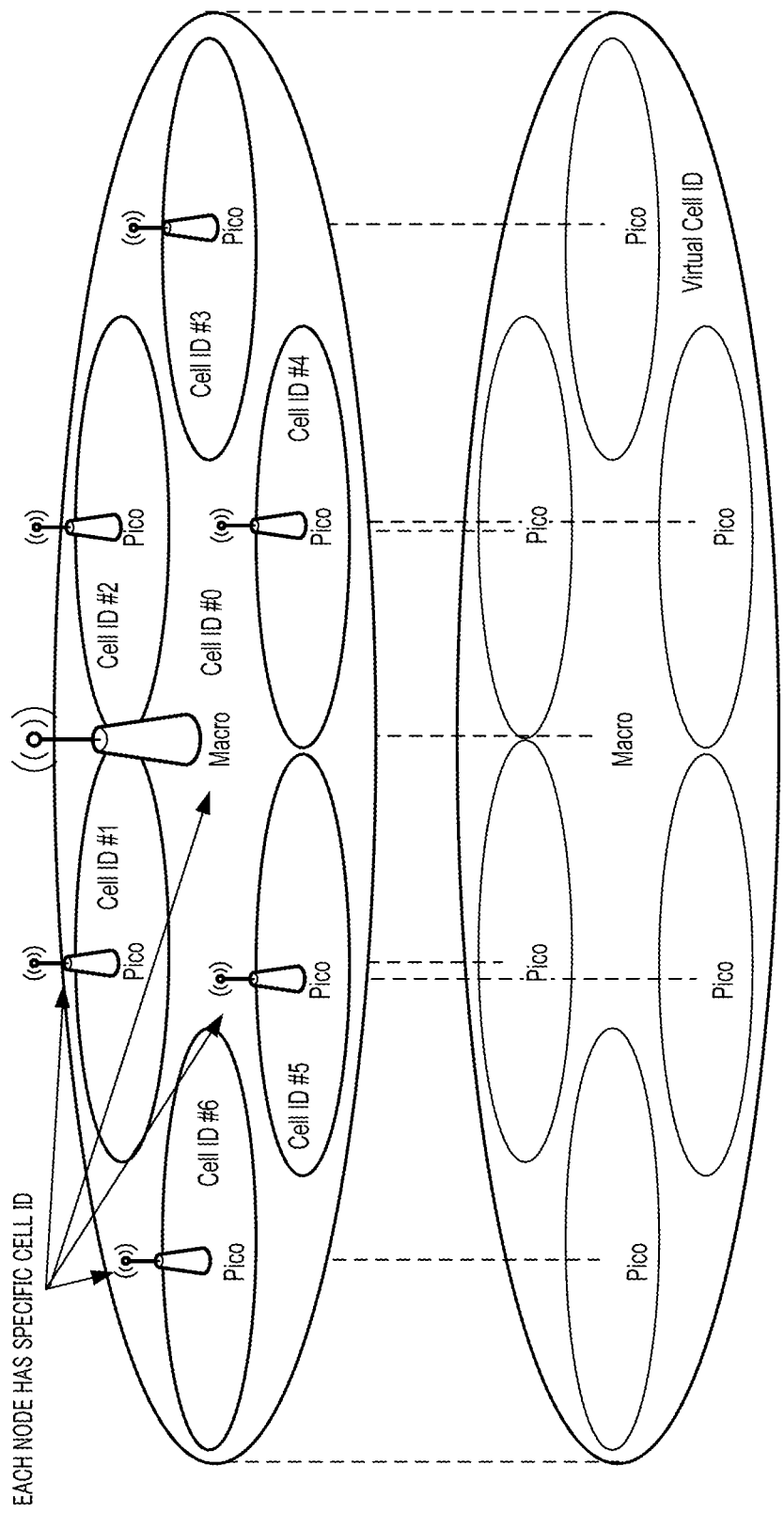
FIG. 16 is a conceptual diagram of a cell in a heterogeneous network having a two-layer structure.

The present invention is also applicable to a case where macro base station 100 and pico base station 200 form cells with mutually different cell IDs. In this case, aside from specific cell IDs, a common cell ID (also referred to as "virtual cell ID") commonly defined for all base stations in the same cell is defined for macro base station 100 and pico base station 200 (FIG. 16). SRSs using a base sequence and hopping pattern generated with a specific cell ID are not orthogonal to each other and cause interferences. On the other hand, SRSs using a base sequence and hopping pattern generated with a common cell ID can be easily made orthogonal to each other among all base stations in the cell.

In a heterogeneous network having a two-layer structure, terminal 300 in the present embodiment generates first P-SRSs using a base sequence and hopping pattern generated with a specific cell ID and generates second P-SRSs using a base sequence and hopping pattern generated with a common cell ID.

Figure 17:
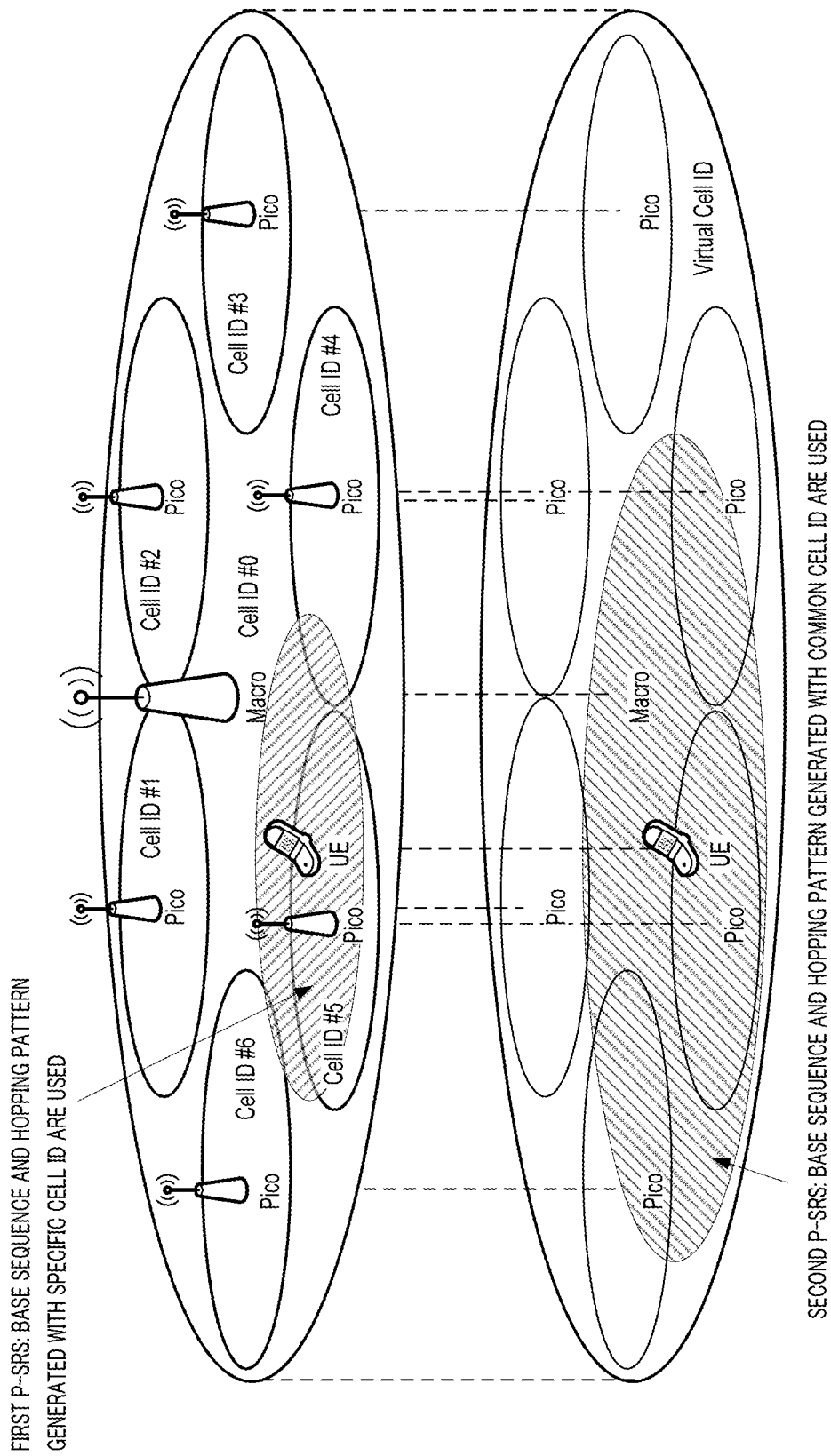
FIG. 17 illustrates a situation in a case where the present invention is applied to a heterogeneous network having a two-layer structure.

As in the case of the conventional heterogeneous network, first P-SRSs and PUSCHs can be used for measurement by only base stations 100 and 200 connected (base station with cell ID #5 in the example of FIG. 17). On the other hand, second P-SRSs can also be made orthogonal to each other by peripheral base stations 100 and 200, and can be used for measurement with high accuracy without causing interference. Therefore, it is possible to realize smooth handover.

Embodiment 3

A case has been described in Embodiments 1 and 2 above where terminal 300 time-division-multiplexes and transmits two types of SRSs: a first P-SRS having a wide-band and low power density and a second P-SRS having a narrow-band and high power density based on transmission parameters notified from macro base station 100.

A case will be described in Embodiment 3 where terminal 300 time-division-multiplexes and transmits two types of SRSs: a first A-SRS having a wide-band and low power density and a second A-SRS having a narrow-band and high power density based on transmission parameters notified from macro base station 100. A configuration of a network system in Embodiment 3 is the same as that of Embodiment 1. Main configurations of macro base station 100, pico base station 200 and terminal 300 in Embodiment 3 are the same as those of Embodiment 1. Embodiment 3 is different from Embodiment 1 in respective functions of receiving section 101, measuring section 102, control section 104 and transmitting section 105 of macro base station 100, receiving section 201 and measuring section 202 of pico base station 200, and receiving section 301, control section 302 and transmitting section 303 of terminal 300.

[Additional Functions of Macro Base Station]

Compared to the processing described in Embodiment 1, receiving section 101 performs A-SRS extraction processing instead of P-SRS extraction processing. Receiving section 101 outputs A-SRSs to measuring section 102. When terminal 300 is located in the vicinity of macro base station 100, receiving section 101 extracts both a first A-SRS and a second A-SRS. On the other hand, when terminal 300 is located far from macro base station 100, receiving section 101 extracts a second A-SRS.

Measuring section 102 measures CSI using an A-SRS and outputs the measurement result to control section 104. When terminal 300 is located in the vicinity of macro base station 100, measuring section 102 measures CSI using the first A-SRS and second A-SRS respectively. On the other hand, when terminal 300 is located far from macro base station 100, measuring section 102 measures CSI using the second A-SRS.

Compared to the processing described in Embodiment 1, control section 104 performs processing of selecting a first A-SRS and second A-SRS instead of processing of selecting a first P-SRS and second P-SRS. More specifically, control section 104 selects, as a first A-SRS, an A-SRS having a wide-band, low power density and a transmission period capable of following a channel variation, and selects, as a second A-SRS, an A-SRS having a narrow-band, high power density and a transmission period capable of following switching between base stations as terminal 300 moves, from among a plurality of A-SRS candidates having mutually different transmission parameters (bandwidth, frequency position, power offset, period and timing). Control section 104 then transmits information indicating transmission parameters of a plurality of A-SRSs including the first A-SRS and second A-SRS (hereinafter, referred to as "A-SRS parameter set") to terminal 300 via transmitting section 105 and transmits the information to each pico base station 200 via inter-base-station interface 103. The A-SRS transmission parameters may be the same as or different from the P-SRS transmission parameters.

When macro base station 100 itself participates in PUSCH reception, control section 104 performs PUSCH frequency scheduling and determines PUSCH transmission parameters of terminal 300 based on the CSI measurement result of the first A-SRS outputted from measuring section 102 and the CSI measurement result of the first A-SRS reported from pico base station 200 participating in PUSCH reception via inter-base-station interface section 103. When macro base station 100 itself does not participate in PUSCH reception, control section 104 performs PUSCH frequency scheduling and determines PUSCH transmission parameters of terminal 300 based on the CSI measurement result of the first A-SRS reported from pico base station 200 participating in PUSCH reception via inter-base-station interface section 103. Control section 104 transmits information indicating the PUSCH frequency scheduling result and information indicating the PUSCH transmission parameters of terminal 300 to terminal 300 via transmitting section 105 and transmits the information to pico base station 200 participating in PUSCH reception via inter-base-station interface section 103.

Compared to the processing described in Embodiment 1, transmitting section 105 performs radio transmission processing (coding, modulation, up-conversion or the like) on an A-SRS parameter set instead of a P-SRS selection set, and transmits the processed A-SRS parameter set to each terminal 300 via an antenna. Note that the A-SRS parameter set may be notified as terminal-specific RRC control information or may be included in the MAC header. Transmitting section 105 determines. for each individual terminal, whether or not to request A-SRS transmission at the next timing when A-SRS transmission is possible, and transmits 1-bit or 2-bit A-SRS trigger included in a PDCCH.

[Additional Function of Pico Base Station]

Compared to the processing described in Embodiment 1, receiving section 201 performs A-SRS extraction processing instead of P-SRS extraction processing. Receiving section 201 outputs an A-SRS to measuring section 202. When terminal 300 is located in the vicinity of pico base station 200, receiving section 201 extracts both a first A-SRS and a second A-SRS. On the other hand, when terminal 300 is located far from pico base station 200, receiving section 201 extracts a second A-SRS.

Measuring section 202 measures CSI using the A-SRS and transmits the measurement result to macro base station 100 via inter-base-station interface section 203. When terminal 300 is located in the vicinity of pico base station 200, measuring section 202 measures CSI using the first A-SRS and second A-SRS respectively. On the other hand, when terminal 300 is located far from pico base station 200, measuring section 202 measures CSI using the second A-SRS.

[Additional Function of Terminal]

Compared to the processing described in Embodiment 1, receiving section 301 performs processing of extracting an A-SRS parameter set instead of processing of extracting a P-SRS selection set. Receiving section 301 outputs the extracted A-SRS parameter set to control section 302. Receiving section 301 detects an A-SRS trigger from a PDCCH and outputs the A-SRS trigger to control section 302.

In accordance with the A-SRS parameter set outputted from receiving section 301, control section 302 instructs transmitting section 303 about transmission parameters (bandwidth, frequency position, power offset, period and timing) of a first A-SRS and a second A-SRS. Control section 302 instructs transmitting section 303 to transmit the first A-SRS or second A-SRS in accordance with the A-SRS trigger outputted from receiving section 301.

Compared to the processing described in Embodiment 1, transmitting section 303 performs radio transmission processing on the first A-SRS and second A-SRS instead of radio transmission processing on the first P-SRS and second P-SRS. More specifically, upon receiving an instruction for transmitting the first A-SRS or second A-SRS from control section 302, transmitting section 303 performs radio transmission processing on the A-SRS at transmittable timing closest to a point in time a predetermined time (e.g., 4 ms) after the A-SRS trigger is detected as a starting point.

Compared to the processing described in Embodiment 1, terminal 300 performs transmission power control on the first A-SRS and second A-SRS instead of transmission power control on the first P-SRS and second P-SRS.

[Operation Flow]

Next, a main processing procedure of each apparatus according to the processing in the present embodiment will be described.

First, macro base station 100 selects a first A-SRS having a wide-band and low power density and a second A-SRS having a narrow-band and high power density. Macro base station 100 then transmits, to terminal 300, an A-SRS parameter set which is information indicating a plurality of A-SRS transmission parameters including the selected two types of A-SRSs.

Figure 18:
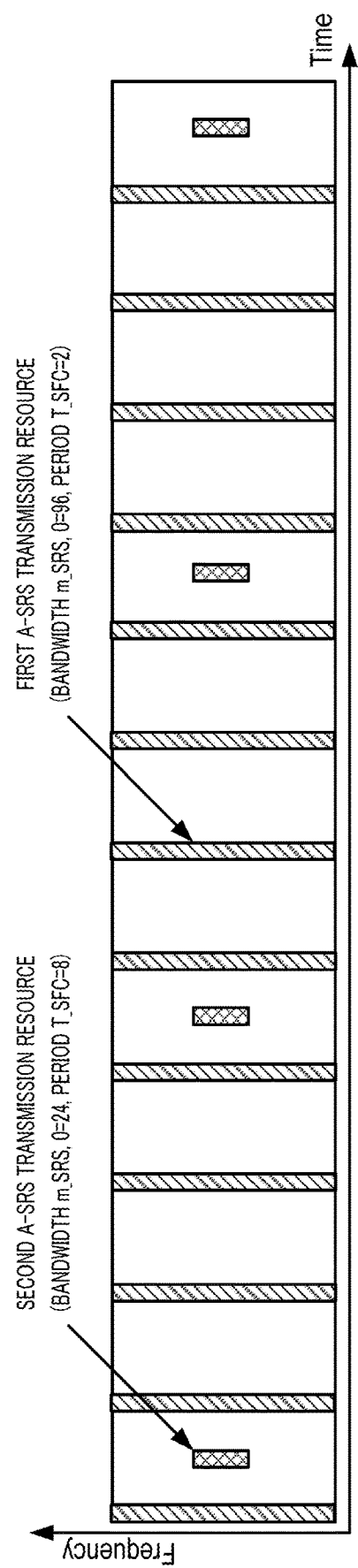
FIG. 18 illustrates an example of A-SRS transmission resources according to Embodiment 3 of the present invention.

Next, terminal 300 sets beforehand, transmission resources of the first A-SRS and second A-SRS based on the A-SRS parameter set received from macro base station 100. FIG. 18 illustrates an example of A-SRS transmission resources set beforehand.

Macro base station 100 includes an A-SRS trigger in a PDCCH as necessary and transmits it to terminal 300.

Figure 19:
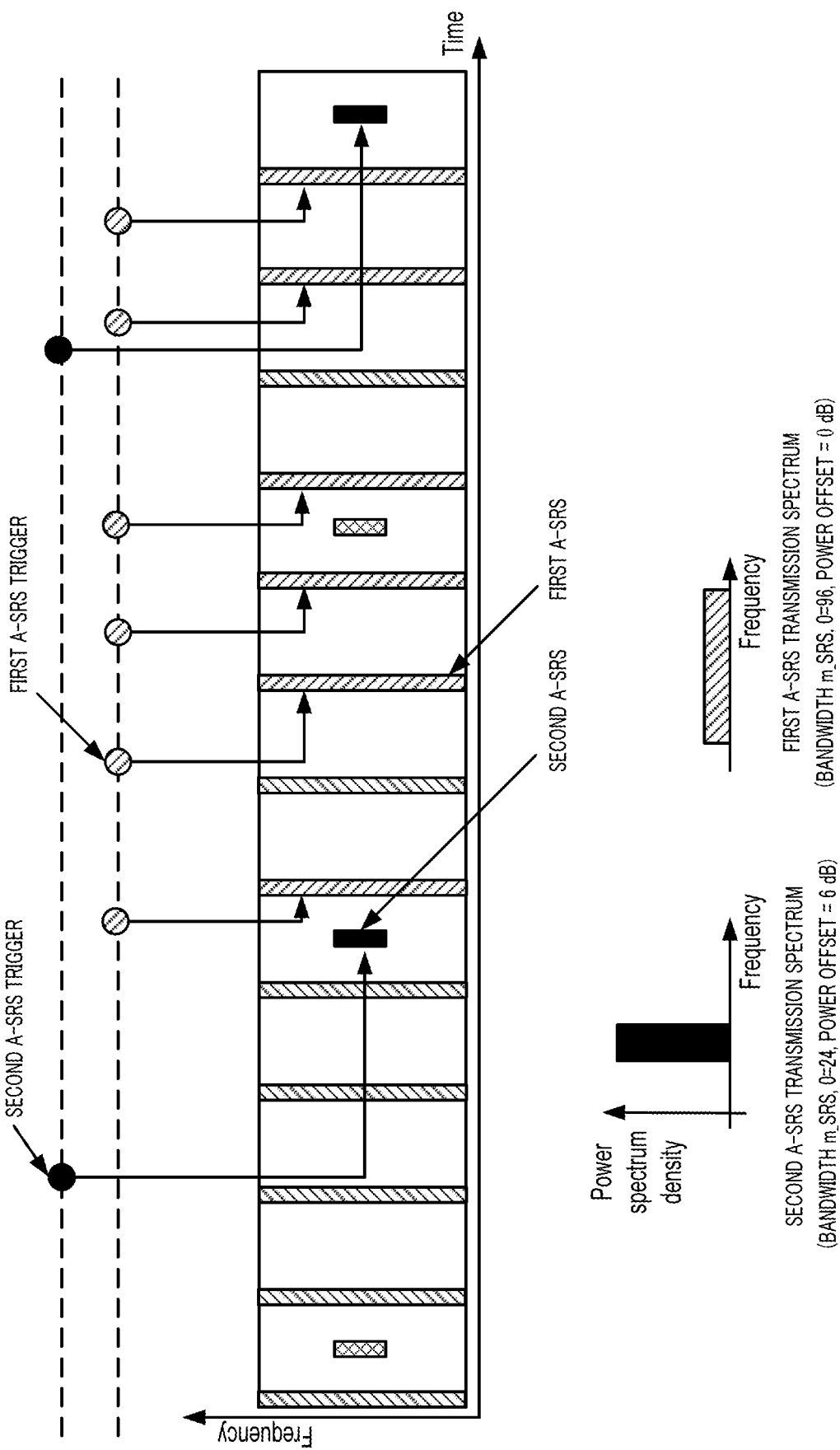
FIG. 19 illustrates an example of A-SRSs transmitted from a terminal according to Embodiment 3 of the present invention.

Upon receiving the A-SRS trigger, terminal 300 transmits the first A-SRS or second A-SRS to each base station 100 or 200 using the transmission resource closest to a point in time a predetermined time (e.g., 4 ms) after the A-SRS trigger is detected among A-SRS transmission resources set beforehand as a starting point. FIG. 19 illustrates an example of A-SRSs transmitted from the terminal according to present Embodiment 3. FIG. 19 illustrates a situation in which the first A-SRS and second A-SRS are respectively transmitted a plurality of times according to A-SRS triggers. The first A-SRS and second A-SRS are transmitted only at predetermined respective periods and timings. Therefore, the first A-SRS and second A-SRS are not transmitted redundantly.

Next, each base station 100 or 200 measures CSI using the received A-SRSs. Macro base station 100 then performs PUSCH frequency scheduling and determines transmission parameters based on the CSI measured in each base station 100 or 200. Macro base station 100 calculates an SINR based on the CSI measured in each base station 100 or 200 and selects a transmission/reception participating base station based on the SINR. Macro base station 100 then notifies terminal 300 and each pico base station 200 of information indicating the selected transmission/reception participating base station. Macro base station 100 further notifies terminal 300 and pico base station 200 participating in PUSCH reception of PUSCH frequency scheduling and PUSCH transmission parameters.

Next, terminal 300 transmits a PUSCH based on the notified PUSCH transmission parameters.

Macro base station 100 continues monitoring CSI measurement results of each base station 100 or 200, switches between transmission/reception participating base stations and changes frequency resources for PUSCH scheduling in accordance with the change in the CSI measurement results.

[Effects]

As described above, in the present embodiment, terminal 300 time-division-multiplexes and transmits two types of SRSs: a first A-SRS having a wide-band and low power density and a second A-SRS having a narrow-band and high power density based on transmission parameters notified from macro base station 100. It is thereby possible to obtain effects similar to those of Embodiment 1. In the present embodiment, since the first A-SRS or second A-SRS is transmitted only when terminal 300 receives an A-SRS trigger, no SRS is transmitted when each base station 100 or 200 does not need any SRSs. This reduces power consumption of terminal 300 and interference provided to other cells. In the present embodiment, since macro base station 100 can select an A-SRS to be transmitted to terminal 300 through an A-SRS trigger, it is possible to freely change the transmission ratio between the first A-SRS and second A-SRS without changing the setting of A-SRS transmission parameters.

[Variation 1]

In the present embodiment, as in the case of variation 4 of Embodiment 2 above, terminal 300 may generate a first A-SRS using a base sequence and hopping pattern generated with a specific cell ID and generate a second A-SRS using a base sequence and hopping pattern generated with a common cell ID.

This allows only base stations 100 and 200 located in the vicinity of terminal 300 to use the first A-SRS for measurement. On the other hand, since the second A-SRS can be easily orthogonalized in all base stations 100 and 200 in the cell, all base stations 100 and 200 can perform measurement with high accuracy using the second A-SRS. Therefore, smooth handover and A-SRS orthogonalization over a wide area can be realized.

[Variation 2]

In the present embodiment, contrary to variation 1, terminal 300 may generate a first A-SRS using a base sequence and hopping pattern generated with a common cell ID and generate a second A-SRS using a base sequence and hopping pattern generated with a specific cell ID.

When the second A-SRS is generated with a different cell ID, each base station 100 or 200 cannot separate the second A-SRS. However, in a situation in which the number of terminals exceeds the capacity of A-SRS orthogonality, generating A-SRSs with different cell IDs rather than generating A-SRSs with a single cell ID can randomize and thereby reduce interference. Therefore, in a situation in which the number of terminals is quite large and there is a shortage in the capacity of A-SRS orthogonality, it is possible to randomize interference of A-SRSs over a wide area.

[Variation 3]

In the present embodiment, preset frequency hopping of A-SRS transmission resources may be performed. That is, frequency positions of A-SRS transmission resources may be caused to hop according to a preset pattern, and, when an A-SRS trigger is received, A-SRSs may be transmitted at frequency positions determined by the hopping.

In this way, CSI can be measured over a wide band even with a second A-SRS, that is, a narrow band A-SRS, by triggering it a plurality of times, and, thereby, even base stations 100 and 200 located far from terminal 300 can thereby obtain wide-band and high accuracy CSI.

Embodiment 4

A case will be described in Embodiment 4 where closed-loop transmission power control is respectively performed on two types of A-SRSs transmitted by terminal 300. A configuration of a network system in Embodiment 4 is the same as that in Embodiment 3. In Embodiment 4, main configurations of macro base station 100, pico base station 200, and terminal 300 are the same as those of Embodiment 3. Embodiment 4 is different from Embodiment 3 in respective functions of control section 104 and transmitting section 105 of macro base station 100 and receiving section 301 and control section 302 of terminal 300.

[Additional Function of Macro Base Station]

In the present embodiment, control section 104 of macro base station 100 performs the processing described in Embodiment 3, and further generates a TPC command (2 bits) of a downlink control signal (PDCCH) based on a comparison in magnitude between a target SINR and an SINR of a received A-SRS and outputs the TPC command to transmitting section 105. Control section 104 outputs a PDCCH to transmitting section 105 and controls transmitting section 105 so that the TPC command is transmitted at timing applied to a desired A-SRS.

Transmitting section 105 performs the processing described in Embodiment 3, and further transmits a PDCCH including a TPC command based on an instruction from control section 104.

In the present embodiment, a signal to which a TPC command is applied changes in accordance with a time during which macro base station 100 transmits the TPC command. The relationship between the transmission time of the TPC command and the signal to which the TPC command is applied is predetermined between macro base station 100 and terminal 300.

Figure 20:
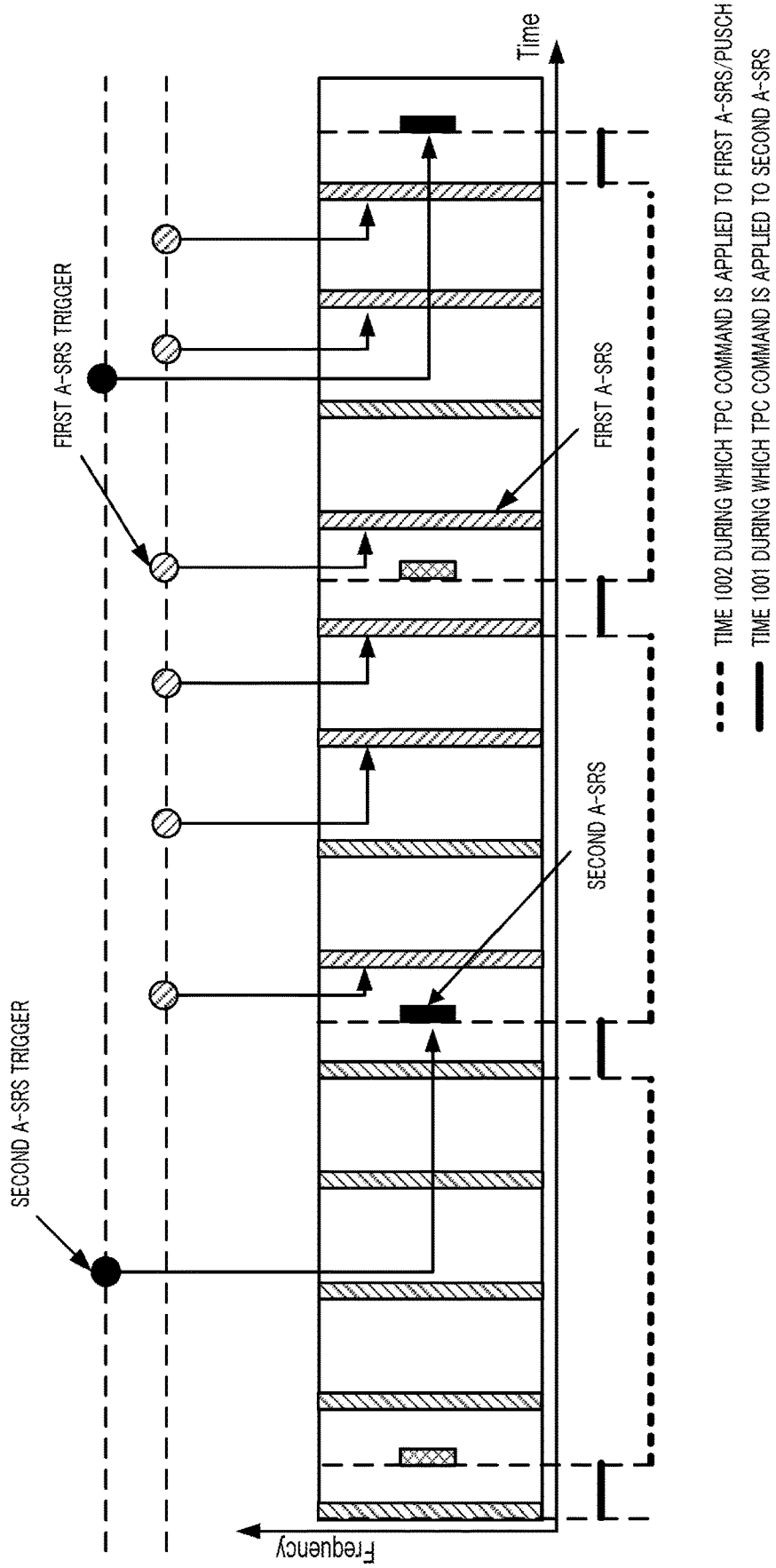
FIG. 20 illustrates an example of A-SRSs transmitted from a terminal and a transmission power control time according to Embodiment 4 of the present invention.

In an example of FIG. 20, only a TPC command transmitted from macro base station 100 during time 1001 between a transmission timing of a first A-SRS transmitted immediately before a second A-SRS and a transmission timing of a second A-SRS is applied to closed-loop control of the second A-SRS, and a TPC command transmitted from macro base station 100 during other time 1002 is applied to closed-loop control of the first A-SRS and PUSCH.

[Additional Function of Terminal]

Receiving section 301 of terminal 300 performs the processing described in Embodiment 3, and further extracts a PDCCH including a TPC command from the received signal and outputs the TPC command to control section 302.

Control section 302 performs the processing described in Embodiment 3, and further monitors timings at which receiving section 301 receives a PDCCH and determines a target signal to which a TPC command included in the PDCCH is applied. Control section 302 then performs the transmission power control instructed by the TPC command on the target signal to which the TPC command is applied.

[Effects]

In addition to the effects of Embodiment 3, the present embodiment achieves an effect of being able to independently perform a plurality of types of closed-loop power controls while minimizing the expansion of TPC commands. For example, according to the present embodiment, TPC commands of Rel. 10 can be used as they are. Of a first A-SRS, a second A-SRS, and a PUSCH, the second A-SRS is a signal intended for reception at base station 100 or 200 located far from terminal 300, and the first A-SRS and PUSCH are signals intended for reception at base station 100 or 200 located in the vicinity of terminal 300. Therefore, in the present embodiment, two mutually independent types of controls: closed-loop control linking both the first A-SRS and PUSCH and closed-loop control of the second A-SRS may be performed. Furthermore, in the present embodiment, signals to which a TPC command is applied can be weighted by changing a combination of periods of two types of A-SRSs. In the example of FIG. 20, time 1002 during which a TPC command is applied to the first A-SRS and PUSCH is seven times as long as time 1001 during which a TPC command is applied to the second A-SRS.

[Variation 1]

In the present embodiment, signals to which a TPC command is applied may also be switched by frequency resources (search spaces) to which a PDCCH including a TPC command is mapped. In this case, a plurality of types of controls can be performed without causing any temporal constraint.

[Variation 2]

In the present embodiment, it is possible to introduce closed-loop controls, and then provide a plurality of frequency resources to which a PDCCH is mapped, and switch between the types of controls in accordance with a time during which a PDCCH including a TPC command is transmitted/received and a frequency resource by which a PDCCH including a TPC command is transmitted/received. In this case, differences as being superior or inferior to each other may be set in time and frequency.

[Variation 3]

In the present embodiment, only when an A-SRS trigger is transmitted, closed-loop control may be applied to a A-SRS to which the trigger is applicable. That is, only TPC commands of PDCCHs instructing transmission of respective A-SRS triggers are applied to A-SRS closed-loop control.

When A-SRSs are not transmitted, it is thereby possible to prevent unnecessary transmission power control from being performed on the A-SRSs.

[Variation 4]

A rule for setting signals to which TPC commands are applied in the present embodiment and variations 1 to 3 may be a rule predetermined in a base station and terminal or a system, or a rule selected by a base station from among a plurality of rules, and notified to respective terminals and thereby applied to a system.

This allows conditions for applying TPC commands to be changed in accordance with the arrangement of a base station, distribution of terminals, traffic and interference conditions.

(1) Although the embodiments have been described above with an antenna as an example, the present invention can be applied to an antenna port in the same manner.

The term "antenna port" refers to a logical antenna including one or more physical antennas. In other words, the term "antenna port" does not necessarily refer to a single physical antenna and may sometimes refer to an antenna array including a plurality of antennas, and/or the like.

For example, how many physical antennas are included in the antenna port is not defined in LTE, but the antenna port is defined as a minimum unit allowing the base station to transmit a different reference signal in LTE.

In addition, an antenna port may be defined as a minimum unit for multiplication of a precoding vector weighting.

(2) In the embodiments described above, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of Japanese Patent Applications No. 2011-219540, filed on Oct. 3, 2011, and No. 2012-108449, filed on May 10, 2012, including the specifications, drawings and abstracts are incorporated herein by reference in their entirety.

INDUSTRIAL APPLICABILITY

The present invention is useful as a terminal, a base station and a communication method capable of performing processing of both selection of a transmission/reception participating base station and PUSCH frequency scheduling, using SRSs in HetNet.

REFERENCE SIGNS LIST

100 Macro base station
101 Receiving section
102 Measuring section
103 Inter-base-station interface section
104 Control section
105 Transmitting section
200 Pico base station
201 Receiving section
202 Measuring section
203 Inter-base-station interface section
204 Transmitting section
300 Terminal
301 Receiving section
302 Control section
303 Transmitting section

The invention claimed is:

1. A base station comprising:
a transmitter, which, in operation, transmits control information in a Physical Downlink Control Channel (PDCCH) to a terminal apparatus, the control information including a transmission request for an aperiodic sounding reference signal (A-SRS) and a transmission power control command (TPC command),
a receiver, which, in operation, receives the A-SRS from the terminal apparatus, and
control circuitry, which, in operation, measures channel state information (CSI) based on the received A-SRS, wherein, the receiver, in operation, receives a first A-SRS at a first transmission power value, and, in response to the transmitter transmitting a request for a second A-SRS, receives the second A-SRS at a second transmission power value;
the first transmission power value is controlled at the terminal apparatus using one or more first TPC commands received in a first time period; and
the second transmission power value is controlled at the terminal apparatus using one or more second TPC commands received in a second time period which is other than the first time period, follows the first time period, and has a different time length than the first time period.

2. The base station according to claim 1, wherein the first transmission power value of the first A-SRS is controlled at the terminal apparatus using the first TPC commands received within a first band, and the second transmission power value of the second A-SRS is controlled at the terminal apparatus using the second TPC commands received within a second band which is different from the first band.

3. The base station according to claim 1, wherein the relationship between transmission timing of the first TPC commands and transmission timing of the first A-SRS is predetermined.

4. The base station according to claim 1, wherein the first transmission power value of the first A-SRS is controlled at the terminal apparatus independently of transmission power control of a Physical Uplink Shared Channel (PUSCH).

5. A communication method performed by a base station, the method comprising:
transmitting control information in a Physical Downlink Control Channel (PDCCH) to a terminal apparatus, the control information including a transmission request for an aperiodic sounding reference signal (A-SRS) and a transmission power control command (TPC command),
receiving the A-SRS from the terminal apparatus, and
measuring channel state information (CSI) based on the received A-SRS,
wherein the receiving of the A-SRS from the terminal apparatus includes:
receiving a first A-SRS at a first transmission power value, which is controlled at the terminal apparatus using one or more first TPC commands received in a first time period, and
receiving a second A-SRS at a second transmission power value, which is controlled at the terminal apparatus using one or more second TPC commands received in a second time period which is other than the first time period, follows the first time period, and has a different time length than the first time period.

6. The communication method according to claim 5, wherein the first transmission power value of the first A-SRS is controlled at the terminal apparatus using the first TPC commands received within a first band, and the second transmission power value of the second A-SRS is controlled at the terminal apparatus using the second TPC commands received within a second band different from the first band.

7. The communication method according to claim 5, wherein the relationship between transmission timing of the first TPC commands and transmission timing of the first A-SRS is predetermined.

8. The communication method according to claim 5, wherein the first transmission power value of the first A-SRS is controlled at the terminal apparatus independently of transmission power control of a Physical Uplink Shared Channel (PUSCH).

9. The communication method according to claim 5, wherein the first A-SRS is received in response to the base station transmitting a request for the first A-SRS to the terminal apparatus.

10. The communication method according to claim 5, wherein the second A-SRS is received in response to the base station transmitting a request for the second A-SRS to the terminal apparatus.

11. An integrated circuit that controls a process performed at a base station apparatus, the integrated circuit comprising:
circuitry which, in operation, controls transmission of control information in a Physical Downlink Control Channel (PDCCH) to a terminal apparatus, the control information including a transmission request for an aperiodic sounding reference signal (A-SRS) and a transmission power control command (TPC command), and an input, which is coupled to the circuitry and which, in operation, receives the A-SRS from the terminal apparatus, wherein the circuitry, in operation, measures channel state information (CSI) based on the received A-SRS received via the input, and wherein the input, in operation, receives a first A-SRS at a first transmission power value, which is controlled at the terminal apparatus using one or more first TPC commands received in a first time period, and receives a second A-SRS at a second transmission power value, which is controlled at the terminal apparatus using one or more second TPC commands received in a second time period which is other than the first time period, follows the first time period, and has a different time length than the first time period.

12. The integrated circuit according to claim 11, wherein the first transmission power value of the first A-SRS is controlled at the terminal apparatus using the first TPC commands received within a first band, and the second transmission power value of the second A-SRS is controlled at the terminal apparatus using the second TPC commands received within a second band which is different from the first band.

13. The integrated circuit according to claim 11, wherein the relationship between transmission timing of the first TPC commands and transmission timing of the first A-SRS is predetermined.

14. The integrated circuit according to claim 11, wherein the first transmission power value of the first A-SRS is controlled at the terminal apparatus independently of transmission power control of a Physical Uplink Shared Channel (PUSCH).

15. The integrated circuit according to claim 11, wherein the first A-SRS is received in response to the base station transmitting a request for the first A-SRS to the terminal apparatus.

16. The integrated circuit according to claim 11, wherein the second A-SRS is received in response to the base station transmitting a request for the second A-SRS to the terminal apparatus.

* * * * *